United States Patent
Konishi et al.

(10) Patent No.: US 11,912,859 B2
(45) Date of Patent: Feb. 27, 2024

(54) EPOXY RESIN COMPOSITION, PREPREG, AND FIBER-REINFORCED COMPOSITE MATERIAL

(71) Applicant: TORAY INDUSTRIES, INC., Tokyo (JP)

(72) Inventors: Daisuke Konishi, Aichi (JP); Yuichi Yamakita, Ehime (JP); Noriyuki Hirano, Ehime (JP); Eiki Takahashi, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 470 days.

(21) Appl. No.: 16/973,768

(22) PCT Filed: Jun. 17, 2019

(86) PCT No.: PCT/JP2019/023850
§ 371 (c)(1),
(2) Date: Dec. 10, 2020

(87) PCT Pub. No.: WO2019/244829
PCT Pub. Date: Dec. 26, 2019

(65) Prior Publication Data
US 2021/0253843 A1 Aug. 19, 2021

(30) Foreign Application Priority Data

| Jun. 18, 2018 | (JP) | 2018-115109 |
| Jun. 18, 2018 | (JP) | 2018-115110 |
| Jun. 18, 2018 | (JP) | 2018-115111 |
| Jul. 24, 2018 | (JP) | 2018-138178 |

(51) Int. Cl.
*C08L 63/00* (2006.01)
*C08J 5/24* (2006.01)

(52) U.S. Cl.
CPC .............. *C08L 63/00* (2013.01); *C08J 5/243* (2021.05); *C08J 5/249* (2021.05); *C08J 2363/00* (2013.01); *C08J 2463/00* (2013.01); *C08J 2481/06* (2013.01); *C08L 2205/025* (2013.01); *C08L 2205/035* (2013.01)

(58) Field of Classification Search
CPC .............. C08L 63/00; C08L 2205/025; C08L 2205/035; C08J 5/249; C08J 5/243; C08J 2363/00; C08J 2463/00; C08J 2481/06
USPC ........................................................ 523/206
See application file for complete search history.

(56) References Cited

U.S. PATENT DOCUMENTS

2011/0009528 A1* 1/2011 Tomioka .................. C08J 5/243
523/427

FOREIGN PATENT DOCUMENTS

| JP | H04275383 | | 9/1992 | |
| JP | 2006241308 A | * | 9/2006 | .............. C08J 5/24 |
| JP | 2008144110 | | 6/2008 | |
| JP | 2010505990 | | 2/2010 | |
| JP | 2010275493 | | 12/2010 | |
| JP | 2012052051 | | 3/2012 | |
| JP | 2012197413 | | 10/2012 | |
| JP | 2014145017 A | * | 8/2014 | ............ C08G 59/32 |
| JP | 2014145018 | | 8/2014 | |
| JP | 2016169381 | | 9/2016 | |
| JP | 2016222935 | | 12/2016 | |
| JP | 2017226745 | | 12/2017 | |
| WO | 2009107697 | | 9/2009 | |
| WO | 2010035859 | | 4/2010 | |
| WO | 2014030638 | | 2/2014 | |
| WO | 2016067736 | | 5/2016 | |
| WO | 2017056653 | | 4/2017 | |

OTHER PUBLICATIONS

Fujiwara et al., JP 2014145017 A machine translation in English, Aug. 14, 2014. (Year: 2014).*
Kawachi et al., JP 2006-241308 A machine translation in English, Sep. 14, 2006. (Year: 2006).*
"International Search Report (Form PCT/ISA/210) of PCT/JP2019/023850", dated Sep. 17, 2019, with English translation thereof, pp. 1-9.
"Office Action of China Counterpart Application", dated Feb. 25, 2023, with English translation thereof, pp. 1-10.
"Decision on Rejection of China Counterpart Application", dated May 17, 2023, with English translation thereof, p. 1-p. 8.

* cited by examiner

*Primary Examiner* — David T Karst
(74) *Attorney, Agent, or Firm* — JCIPRNET

(57) ABSTRACT

The purpose of the present invention is to provide: an epoxy resin composition capable of giving cured resins which combine flexural modulus with flexural strain on a high level and have excellent heat resistance; a prepreg comprising the epoxy resin composition and reinforcing fibers; and a fiber-reinforced composite material obtained by curing the prepreg and excellent especially in terms of 0° and 90° bending strength. An embodiment of the epoxy resin composition of the present invention for achieving such purpose is an epoxy resin composition which comprises the following components [A], [B], and [C] and satisfies a specific requirement. Component [A]: a trifunctional amine type epoxy resin. Component [B]: a bisphenol F type epoxy resin which is solid at 25° C. Component [C]: an aromatic amine compound.

3 Claims, No Drawings

EPOXY RESIN COMPOSITION, PREPREG, AND FIBER-REINFORCED COMPOSITE MATERIAL

CROSS-REFERENCE TO RELATED APPLICATION

This application is a 371 application of the International PCT application serial no. PCT/JP2019/023850, filed on Jun. 17, 2019, which claims the priority benefit of Japan Patent Application No. 2018-115109, filed on Jun. 18, 2018, Japan Patent Application No. 2018-115110, filed on Jun. 18, 2018, Japan Patent Application No. 2018-115111, filed on Jun. 18, 2018 and Japan Patent Application No. 2018-138178, filed on Jul. 24, 2018. The entirety of each of the above-mentioned patent applications is hereby incorporated by reference herein and made a part of this specification.

TECHNICAL FIELD

The present invention relates to an epoxy resin composition that is preferably used as a matrix resin of a fiber-reinforced composite material suitable for sports applications, general industrial applications, and aerospace applications, and a prepreg and a fiber-reinforced composite material, in which the epoxy resin composition is used as a matrix resin.

BACKGROUND ART

A sheet-shaped intermediate substrate (prepreg) produced by impregnating a reinforcing fiber with a thermosetting resin is generally used for manufacturing a fiber-reinforced plastic. A molded body is produced by a method in which prepregs are stacked and heated to cure the thermosetting resin, and is applied to various fields such as aircraft and sports. As the thermosetting resin used as the matrix resin of a prepreg, an epoxy resin is generally used because of its excellent heat resistance, adhesiveness, and mechanical strength. In recent years, as the application of fiber-reinforced composite materials to structural members has expanded, demand for further weight reduction of the members has increased, and the epoxy resins used in the prepregs have been desired to have further high performance. Specifically, it is possible to design a lightweight and high-performance fiber-reinforced composite material by simultaneously enhancing the elastic modulus and the deformability of the epoxy resin cured product.

Patent Document 1 discloses a technique in which a polyfunctional bisphenol type epoxy resin and an amine type epoxy resin are used in combination to achieve both the flexural modulus and the breaking strength of an epoxy resin cured product.

Patent Document 2 discloses a technique in which a trifunctional or higher functional amine type epoxy resin and a high molecular weight bisphenol F type epoxy resin are used to enhance the elastic modulus of an epoxy resin cured product.

Patent Document 3 describes a technique in which an aminophenol type epoxy resin is cured with an aromatic amine compound to enhance the flexural modulus and the breaking strength of an epoxy resin cured product.

Patent Document 4 describes a technique in which an epoxy resin composition containing an amine type epoxy resin and a thermoplastic resin as essential components is cured with an aromatic amine to enhance the deformability while the heat resistance of the epoxy resin cured product is maintained.

Patent Document 5 discloses a technique in which an epoxy resin having an oxazolidone ring structure in the molecule and a triblock copolymer are used in combination to enhance the heat resistance and the fracture toughness of a fiber-reinforced composite material.

Patent Document 6 discloses a resin and a prepreg for improving the CFRP 90-degree bending in order to enhance the breaking strength of a CFRP tubular body.

PRIOR ART DOCUMENTS

Patent Documents

Patent Document 1: Japanese Patent Laid-open Publication No. 2017-226745
Patent Document 2: Japanese Patent Laid-open Publication No. 2012-197413
Patent Document 3: Japanese Patent Laid-open Publication No. 2010-275493
Patent Document 4: International Publication No. 2016/067736
Patent Document 5: International Publication No. 2014/030638
Patent Document 6: Japanese Patent Laid-open Publication No. 2016-222935

SUMMARY OF THE INVENTION

Problems to be Solved by the Invention

In order to enhance the breaking strength of a fiber-reinforced composite material, it is generally necessary to simultaneously enhance the elastic modulus and the deformability of the epoxy resin cured product. However, when the elastic modulus of an epoxy resin cured product is enhanced, the deformability is generally deteriorated. Furthermore, when the deformability of an epoxy resin cured product is enhanced, the glass transition temperature is reduced, and the epoxy resin is difficult to apply to applications in which the heat resistance is required. Therefore, it is desired to construct a technique to simultaneously enhance the elastic modulus, the deformability, and the heat resistance.

However, regarding the epoxy resin composition described in Patent Document 1, the flexural modulus of the resin cured product is insufficient, and it cannot be said that the fiber-reinforced composite material has a sufficient bending strength in the 0° direction.

Regarding the epoxy resin composition described in Patent Document 2, the resin cured product exhibits a relatively high flexural modulus, but the bending strain is insufficient, and as a result, the fiber-reinforced composite material has an insufficient bending strength in the 90° direction.

Regarding the epoxy resin composition disclosed in Patent Document 3, both the flexural modulus and the bending strength of the resin cured product are insufficient, and the fiber-reinforced composite material has a low mechanical property.

Regarding the epoxy resin composition disclosed in Patent Document 4, the heat resistance of the resin cured product is high, but the flexural modulus is insufficient, and the fiber-reinforced composite material has a low mechanical property.

Regarding the epoxy resin composition disclosed in Patent Document 5, the amount of the deformation of the resin cured product is large, but the flexural modulus is insufficient, and as a result, the fiber-reinforced composite material has a low bending strength in the 0° direction.

Regarding the epoxy resin composition described in Patent Document 6, the flexural modulus and the strength of the resin cured product are insufficient, and it cannot be said that the fiber-reinforced composite material has a sufficient bending strength in the 0° direction.

An object of the present invention is to improve the defects of the conventional techniques, and to provide an epoxy resin composition with which a resin cured product can be obtained that achieves both the flexural modulus and the bending strain at a high level and has excellent heat resistance, a prepreg including the epoxy resin composition and a reinforcing fiber, and a fiber-reinforced composite material that is produced by curing the prepreg and is excellent in the bending strength particularly in the 0° direction and the 90° direction.

Solutions to the Problems

As a result of intensive studies to solve the above-described problems, the present inventors have found an epoxy resin composition having the following configuration, and have completed the present invention. That is, the epoxy resin composition according to the present invention has any one of configurations in Aspects 1 to 4 described below.

Aspect 1 is an epoxy resin composition including:
a component [A] being a trifunctional amine type epoxy resin;
a component [B] being a bisphenol F type epoxy resin being solid at 25° C.; and
a component [C] being an aromatic amine compound,
wherein all of a condition 1, a condition 2, and a condition 3 described below are satisfied,
the condition 1 being that a resin cured product produced by reacting the epoxy resin composition at 180° C. for 120 minutes has a flexural modulus of 4.4 GPa or more,
the condition 2 being that the resin cured product produced by reacting the epoxy resin composition at 180° C. for 120 minutes has a bending strength of 190 MPa or more, and
the condition 3 being that an average epoxy equivalent of the component [A] (Ea) and an average epoxy equivalent of the component [B] (Eb) satisfy Formula (1) described below:

$$6 \leq Eb/Ea \leq 10 \quad (1).$$

Aspect 2 is an epoxy resin composition including:
a component [A] being a trifunctional amine type epoxy resin;
a component [B] being a bisphenol F type epoxy resin being solid at 25° C.; and
a component [C] being an aromatic amine compound,
wherein all of a condition 4, a condition 5, and a condition 6 described below are satisfied,
the condition 4 being that a resin cured product produced by reacting the epoxy resin composition at 180° C. for 120 minutes has a bending strain amount of 6% or more,
the condition 5 being that an average epoxy equivalent of the component [B] is 600 to 1,000 g/eq, and
the condition 6 being that the resin cured product produced by reacting the epoxy resin composition at 180° C. for 120 minutes has a glass transition temperature X (° C.) and a storage elastic modulus in a rubber state Y (MPa), the glass transition temperature and the storage elastic modulus determined by dynamic viscoelasticity measurement and satisfying Formula (2) described below:

$$0.087X - 6 \leq Y \leq 0.087X - 4 \quad (2).$$

Aspect 3 is an epoxy resin composition including:
a component [A] being a trifunctional amine type epoxy resin;
a component [B] being a bisphenol F type epoxy resin being solid at 25° C.; and
a component [C] being an aromatic amine compound,
wherein a condition 5 and a condition 7 described below are satisfied,
the condition 5 being that an average epoxy equivalent of the component [B] is 600 to 1,000 g/eq, and
the condition 7 being that a resin cured product produced by reacting the epoxy resin composition at 180° C. for 120 minutes has a storage elastic modulus in a rubber state Y (MPa) determined by dynamic viscoelasticity measurement and has an active group mole number in 100 parts by mass of all epoxy resins (Ma), the storage elastic modulus and the active group mole number satisfying Formula (3) described below:

$$1,100 \leq Y/Ma \leq 2,000 \quad (3).$$

Aspect 4 is an epoxy resin composition including:
a component [A] being a trifunctional amine type epoxy resin;
a component [E] being a sorbitol type epoxy resin; and
a component [F] being dicyandiamide or a derivative of dicyandiamide,
wherein all of a condition 8, a condition 9, and a condition 10 described below are satisfied,
the condition 8 being that a resin cured product produced by reacting the epoxy resin composition at 130° C. for 90 minutes has a flexural modulus of 4.3 GPa or more,
the condition 9 being that the resin cured product produced by reacting the epoxy resin composition at 130° C. for 90 minutes has a bending strength of 190 MPa or more, and
the condition 10 being that the epoxy resin composition includes the component [A] and the component [E] at a total content of 40 parts by mass or more based on 100 parts by mass of all epoxy resins in the epoxy resin composition.

The prepreg according to the present invention includes the epoxy resin composition and a reinforcing fiber.

The fiber-reinforced composite material according to the present invention includes the prepreg that is cured.

Effects of the Invention

The epoxy resin composition according to the present invention is an epoxy resin composition with which a resin cured product can be obtained that achieves both the flexural modulus and the bending strain at a high level and has excellent heat resistance. The fiber-reinforced composite material in which the epoxy resin composition according to the present invention is used as a matrix resin exhibits excellent bending strength in the 0° direction and the 90° direction.

EMBODIMENTS OF THE INVENTION

Aspects 1 to 3 of the epoxy resin composition according to the present invention include a component [A] being a trifunctional amine type epoxy resin, a component [B] being a bisphenol F type epoxy resin being solid at 25° C., and a component [C] being an aromatic amine compound as essential components. The fiber-reinforced composite material in which Aspects 1 to 3 of the epoxy resin composition according to the present invention are used as a matrix resin is excellent also in the interlaminar toughness.

Aspect 4 of the epoxy resin composition according to the present invention includes the component [A] being a trifunctional amine type epoxy resin, a component [E] being a sorbitol type epoxy resin, and a component [F] being dicyandiamide or its derivative as essential components.

First, Aspects 1 to 3 of the epoxy resin composition according to the present invention will be described. Note that in the present description, Aspects 1 to 4 of the epoxy resin composition according to the present invention are sometimes simply referred to as Aspects 1 to 4 of the present invention. When the term "present invention" is used without specifying an aspect, the term refers to all aspects of Aspects 1 to 4.

(Component [A])

The component [A] in the present invention is a trifunctional amine type epoxy resin.

Examples of the component [A] include triglycidylaminophenol type epoxy resins and triglycidylaminocresol type epoxy resins.

Examples of the triglycidylaminophenol type epoxy resin include "SUMI-EPOXY (registered trademark)" ELM100 and ELM120 (manufactured by SUMITOMO CHEMICAL COMPANY, LIMITED), and "Araldite (registered trademark)" MY0500, MY0510, and MY0600 (all manufactured by Huntsman Advanced Materials LLC.).

Among the trifunctional amine type epoxy resins, the component [A] is preferably an aminophenol type epoxy resin. In the case that the component [A] is an aminophenol type epoxy resin, the flexural modulus of the resin cured product is high, and a fiber-reinforced composite material having high bending strength in the 0° direction is easily obtained.

Furthermore, in order to enhance the flexural modulus of the epoxy resin cured product, the component [A] is preferably included at a content of 50 to 80 parts by mass, and more preferably 55 to 65 parts by mass based on 100 parts by mass of all the epoxies. If the above-described range is satisfied, an epoxy resin cured product is easily obtained in which the flexural modulus and the bending strength of the resin cured product are in good balance.

(Component [B])

The component [B] in Aspects 1 to 3 of the present invention is a bisphenol F type epoxy resin being solid at 25° C.

Examples of the bisphenol F type epoxy resin include "jER (registered trademark)" 4004P, 4005P, and 4010P (all manufactured by Mitsubishi Chemical Corporation), and "Epotohto (registered trademark)" YDF-2001, YDF-2004, and YDF-2005RD (all manufactured by Tohto Kasei Co., Ltd.).

In Aspects 1 to 3 of the present invention, the component [B] is preferably included at a content of 20 to 40 parts by mass based on 100 parts by mass of all the epoxies. If the above-described range is satisfied, the bending strength can be easily enhanced without reducing the flexural modulus of the resin cured product.

(Component [C])

The component [C] in Aspects 1 to 3 of the present invention is an aromatic amine compound.

Examples of the component [C] include aniline, diethyltoluenediamine, 4,4'-methylenebis(2-isopropyl-6-methylaniline), and diaminodiphenylsulfone.

As the diethyltoluenediamine, "jERCURE (registered trademark)" W (manufactured by Mitsubishi Chemical Corporation) or the like can be used. As the 4,4'-methylenebis (2-isopropyl-6-methylaniline), "Lonzacure (registered trademark)" M-MIPA (manufactured by Lonza) or the like can be used. Examples of the diaminodiphenylsulfone include "SEIKACURE (registered trademark)"-S(manufactured by SEIKA CORPORATION) and 3,3'-DAS (manufactured by Mitsui Fine Chemicals, Inc.).

Among the aromatic amine compounds, the component [C] is preferably diaminodiphenylsulfone, and more preferably 3,3'-diaminodiphenylsulfone. In the case that the component [C] is diaminodiphenylsulfone, the flexural modulus of the resin cured product tends to be high, and a fiber-reinforced composite material having further high bending strength in the 0° direction is easily obtained.

In Aspects 1 to 3 of the present invention, the relationship between the active hydrogen mole number of the component [C] (Mc) and the active epoxy group mole number in 100 parts by mass of all the epoxy resins (Ma) is preferably represented by the range shown in Formula (4) described below.

$$0.95 \leq Ma/Mc \leq 1.05 \tag{4}$$

By setting the relationship in the above-described range, the reaction between the epoxy resin and the curing agent is likely to occur efficiently, so that the resin cured product tends to have high bending strength, and a fiber-reinforced composite material having further high bending strength in the 90° direction is easily obtained.

The active epoxy group mole number in 100 parts by mass of all the epoxy resins (Ma) is the sum of the mole numbers of each epoxy resin active group, and is represented by the following formula.

$Ma$=(mass of epoxy resin $A$/epoxy equivalent of epoxy resin $A$)+(mass of epoxy resin $B$/epoxy equivalent of epoxy resin $B$)+ . . . +(mass of epoxy resin $W$/epoxy equivalent of epoxy resin $W$)

The active hydrogen mole number of the component [C](Mc) is determined by dividing the mass of the aromatic amine compound by the active hydrogen equivalent of the aromatic amine compound, and is represented by the following formula.

$Mc$=mass of aromatic amine compound/active hydrogen equivalent of aromatic amine compound Aspect 1 of the epoxy resin composition according to the present invention includes the component [A], the component [B], and the component [C], and satisfies all of a condition 1, a condition 2, and a condition 3 described below.

The resin cured product produced by curing the epoxy resin composition at 180° C. for 120 minutes has a flexural modulus of 4.4 GPa or more (the condition 1) and a bending strength of 190 MPa or more (the condition 2). If the flexural modulus and the bending strength of the resin cured product are in the above-described ranges, a fiber-reinforced composite material is easily obtained that achieves both the bending strength in the 0° direction and the bending strength in the 90° direction at a high level. If the flexural modulus is 4.4 GPa or more, a sufficient bending characteristic in the 0° direction is easily obtained. If the bending strength is 190

MPa or more, a sufficient bending characteristic in the 0° direction and the 90° direction is easily obtained.

The conditions 1 and 2 can be satisfied by blending the component [A], the component [B], and the component [C] in an appropriate ratio.

Here, the flexural modulus and the bending strength of the resin cured product according to the present invention can be evaluated by, for example, performing a three-point bending test in accordance with JIS K7171 (1994).

In Aspect 1 of the present invention, the relationship between the average epoxy equivalent of the component [A](Ea) and the average epoxy equivalent of the component [B](Eb) is required to satisfy Formula (1) described below (the condition 3).

$$6 \leq Eb/Ea \leq 10 \quad (1)$$

If the value of Eb/Ea is 6 or more, a sufficient flexural modulus of the epoxy resin cured product is easily obtained, and the fiber-reinforced composite material tends to have sufficient bending strength in the 0° direction. If Eb/Ea is 10 or less, the deformability of the resin cured product is not easily lost and the bending strength is less likely to decrease, so that the fiber-reinforced composite material tends to have sufficient bending strength in the 90° direction.

In Aspect 1 of the epoxy resin composition according to the present invention, both the flexural modulus and the bending strength of the resin cured product can be easily achieved at a further high level because the average epoxy equivalents of the component [A] and the component [B] satisfy the above-described range. The reason is not clear, but is presumably that the fact that Eb/Ea is in the specific range increases the number of the bonding points formed by the reaction between the epoxy resin and the curing agent, and the fragile portions are reduced that are generated when the epoxy resin cured product is deformed and are starting points of destruction, and the deformability is improved.

Here, the average epoxy equivalents of the component [A] and the component [B] can be evaluated by, for example, performing potentiometric titration in accordance with JIS K7236 (2001).

Aspect 2 of the epoxy resin composition according to the present invention includes the component [A], the component [B], and the component [C], and satisfies all of a condition 4, a condition 5, and a condition 6 described below.

The resin cured product produced by curing the epoxy resin composition at 180° C. for 120 minutes has a bending strain amount of 6% or more (the condition 4). If the resin cured product has a bending strain in the above-described range, the fiber-reinforced composite material including the epoxy resin composition as a matrix resin tends to have excellent bending strength in the 90° direction. If the bending strain amount is 6% or more, a sufficient bending characteristic in the 90° direction is easily obtained.

The condition 4 can be achieved by blending the component [A], the component [B], and the component [C] in an appropriate ratio.

Here, the bending strain amount of the resin cured product according to the present invention can be evaluated by, for example, performing a three-point bending test in accordance with JIS K7171 (1994). Here, the bending strain amount in the present invention can be calculated from the displacement amount when the maximum load is shown in the three-point bending test.

The average epoxy equivalent (hereinafter, EEW) of the component [B] is in the range of 600 to 1,000 g/eq (the condition 5). If the EEW of the component [B] is 600 g/eq or more, a sufficient flexural modulus is easily obtained. If the EEW of the component [B] is 1,000 g/eq or less, the flexural modulus and the strain amount are likely to be improved.

In Aspect 2 of the epoxy resin composition according to the present invention, the resin cured product produced by curing the epoxy resin composition at 180° C. for 120 minutes has a glass transition temperature X (° C.) and a storage elastic modulus in a rubber state Y (MPa), the glass transition temperature and the storage elastic modulus determined by dynamic viscoelasticity measurement and satisfying the following formula (the condition 6).

$$0.087X-6 \leq Y \leq 0.087X-4 \quad (2)$$

If the storage elastic modulus in a rubber state is 0.087X−6 or more, both the bending strain amount and the heat resistance are easily achieved. If the storage elastic modulus is 0.087X−4 or less, a sufficient flexural modulus is easily obtained, and the fiber-reinforced composite material tends to have a sufficient bending strength in the 0° direction.

In Aspect 2 of the epoxy resin composition according to the present invention, a fiber-reinforced composite material excellent in the balance between the bending strength and the heat resistance is easily obtained because the storage elastic modulus in a rubber state Y satisfies the above-described range. The reason is not clear, but is presumably that the density of the crosslinking points in the epoxy resin cured product is appropriate because the relationship between the storage elastic modulus in a rubber state and the glass transition temperature is in the specific range.

Here, the glass transition temperature and the storage elastic modulus in a rubber state of the resin cured product according to the present invention can be calculated from the scatter diagram of the storage elastic modulus and the temperature that are obtained by performing temperature rise measurement by DMA measurement (dynamic viscoelasticity measurement). The glass transition temperature is the temperature at the intersection of the tangent line drawn in the glass region and the tangent line drawn in the glass transition region in the above-described scatter diagram. The storage elastic modulus in a rubber state is the storage elastic modulus at a temperature higher than the glass transition temperature by 50° C.

Aspect 3 of the epoxy resin composition according to the present invention includes the component [A], the component [B], and the component [C], and simultaneously satisfies the condition 5 and a condition 7 described below.

The resin cured product produced by curing the epoxy resin composition at 180° C. for 120 minutes has a storage elastic modulus in a rubber state Y (MPa) determined by dynamic viscoelasticity measurement and has an active epoxy group mole number in 100 parts by mass of all the epoxy resins (Ma), the storage elastic modulus and the active epoxy group mole number satisfying the following formula (the condition 7).

$$1,100 \leq Y/Ma \leq 2,000 \quad (3)$$

If the value of Y/Ma is 1,100 or more, the fiber-reinforced composite material tends to have sufficient bending strength in the 90° direction and sufficient interlaminar toughness because sufficient bending strength of the epoxy resin cured product is easily obtained. If Y/Ma is 2,000 or less, the fiber-reinforced composite material tends to have sufficient bending strength because bending strength and, in addition, a sufficient elastic modulus of the resin cured product are easily obtained.

In Aspect 3 of the epoxy resin composition according to the present invention, both the flexural modulus and the bending strength are easily achieved at a further high level because the storage elastic modulus in a rubber state and the active epoxy group mole number in 100 parts by mass of all the epoxy resins satisfy the above-described range. The reason is not clear, but is presumably that the fact that Y/Ma is in a specific range efficiently promotes the consumption, that is due to the curing reaction, of the epoxy group. The reason is considered to be that the resin cured product produced by curing the epoxy resin composition has a small amount of unreacted epoxy resin remaining and exhibits a uniform crosslinked state, that is, the stress generated during the deformation can be dispersed.

In Aspect 3 of the epoxy resin composition according to the present invention, the resin cured product produced by curing the epoxy resin composition at 180° C. for 120 minutes preferably has a flexural modulus of 4.6 GPa or more, and a bending strain amount of 6% or more. Because the resin cured product tends to have excellent bending strength by the flexural modulus and the bending strain amount in the above-described ranges, the fiber-reinforced composite material including the epoxy resin composition tends to have both high bending strength and high interlaminar toughness.

Here, Aspect 1 of the epoxy resin composition according to the present invention includes the component [A], the component [B], and the component [C], and satisfies the condition 1, the condition 2, and the condition 3, and in addition, preferably satisfies any one of conditions shown in (i), (ii), and (iii) described below.

(i) The condition 4, the condition 5, and the condition 6 are satisfied.
(ii) The condition 5 and the condition 7 are satisfied.
(iii) The condition 4, the condition 5, the condition 6, and the condition 7 are satisfied.

Each condition will be described below.

About (i)

By simultaneously satisfying the condition 1, the condition 2, the condition 3, and in addition, the condition 4, the condition 5, and the condition 6, an epoxy resin composition is easily obtained that has both high resin flexural modulus and high bending strength, and heat resistance in excellent balance. The fiber-reinforced composite material including the epoxy resin composition exhibits high bending strength in the 0° direction and the 90° direction, and is preferably used for applications in which the heat resistance is required.

About (ii)

By simultaneously satisfying the condition 1, the condition 2, the condition 3, and in addition, the condition 5, and the condition 7, the fiber-reinforced composite material including the epoxy resin composition has bending strength in both the 0° direction and the 90° direction, and excellent interlaminar toughness.

About (iii)

It is particularly preferable to satisfy all of the conditions 1 to 7 simultaneously because of the improvement in the interlaminar toughness of the fiber-reinforced composite material that has high resin flexural modulus and high strength, and in addition, heat resistance in excellent balance, and includes the epoxy resin composition.

Next, Aspect 4 of the present invention will be described. Aspect 4 of the epoxy resin composition according to the present invention includes the component [A] being a trifunctional amine type epoxy resin, the component [E] being a sorbitol type epoxy resin, and the component [F] being dicyandiamide as essential components. The fiber-reinforced composite material in which Aspect 4 of the epoxy resin composition according to the present invention is used as a matrix resin preferably has excellent interlaminar toughness.

Examples of the component [A] include triglycidylaminophenol type epoxy resins and triglycidylaminocresol type epoxy resins in the same manner as in Aspects 1 to 3 of the present invention described above.

Among the trifunctional amine type epoxy resins, the component [A] is preferably an aminophenol type epoxy resin. In the case that the component [A] is an aminophenol type epoxy resin, the flexural modulus of the resin cured product is likely to be high, and a fiber-reinforced composite material having high bending strength in the 0° direction is easily obtained.

Furthermore, in order to enhance the flexural modulus of the epoxy resin cured product, the component [A] is preferably included at a content of 50 to 80 parts by mass based on 100 parts by mass of all the epoxy resins in the epoxy resin composition. If this range is satisfied, the balance between the flexural modulus and the bending strength in the resin cured product can be enhanced.

Hereinafter, the component [E] and the component [F] will be described.

(Component [E])

The component [E] in Aspect 4 of the present invention is a sorbitol type epoxy resin.

Examples of the component [E] include "DENACOL (registered trademark)" EX-614 and EX-614B (all manufactured by Nagase ChemteX Corporation).

In Aspect 4 of the present invention, the component [E] is preferably included at a content of 20 to 40 parts by mass based on 100 parts by mass of all the epoxy resins in the epoxy resin composition. If this range is satisfied, the balance between the bending strain and the bending strength in the resin cured product can be further enhanced.

In Aspect 4 of the epoxy resin composition according to the present invention, the epoxy resin composition includes the component [A] and the component [E] at a total content of 40 parts by mass or more based on 100 parts by mass of all the epoxy resins in the epoxy resin composition (the condition 10).

If the total content of the component [A] and the component [E] is 40 parts by mass or more, the balance between the flexural modulus and the strain in the epoxy resin cured product is likely to be sufficient, and sufficient bending strength is easily obtained. The reason is not clear, but is presumably that the sorbitol type epoxy that has a flexible main chain and is polyfunctional effectively complements the defect in the network structure including the trifunctional aminophenol type epoxy and dicyandiamide.

In Aspect 4 of the epoxy resin composition according to the present invention, the resin cured product produced by curing the epoxy resin composition at 130° C. for 90 minutes has a flexural modulus of 4.3 GPa or more (the condition 8), and a bending strength of 190 MPa or more (the condition 9). If the flexural modulus and the bending strength of the resin cured product are in the above-described ranges, a fiber-reinforced composite material is easily obtained that achieves both the bending strength in the 0° direction and the bending strength in the 90° direction at a high level. If the flexural modulus is 4.3 GPa or more, a sufficient bending characteristic in the 0° direction is easily obtained. If the bending strength is 190 MPa or more, a sufficient bending characteristic in the 0° direction and the 90° direction is easily obtained.

The conditions 8 and 9 can be satisfied by blending the component [A], the component [E], and the component [F] in an appropriate ratio.

(Component [D])

In Aspect 4 of the present invention, a component [D]-1 and/or a component [D]-2 described below is preferably included as a component [D]. If the component [D] is included, the balance can be easily enhanced among the flexural modulus, the bending strength, and in addition, the glass transition temperature in the resin cured product. The glass transition temperature is a temperature that is an index of the heat resistance of an epoxy resin cured product, and can be evaluated by DMA or DSC measurement of the resin cured product.

Component [D]-1: naphthalene type epoxy resin
Component [D]-2: isocyanuric acid type epoxy resin The component [D]-1 in Aspect 4 of the present invention is a naphthalene type epoxy resin.

Examples of the naphthalene type epoxy resin include "EPICLON (registered trademark)" HP-4032D, HP-4700, HP-4770, HP-5000, and HP-4710 (all manufactured by DIC Corporation).

The component [D]-2 in Aspect 4 of the present invention is an isocyanuric acid type epoxy resin.

Examples of the isocyanuric acid type epoxy resin include "TEPIC (registered trademark)"-S, -G, -L, -PAS, -UC, and -FL (all manufactured by Nissan Chemical Corporation)

(Component [F])

The component [F] in Aspect 4 of the present invention is dicyandiamide or a derivative of dicyandiamide.

Dicyandiamide is a compound represented by the chemical formula $(H_2N)_2C=N-CN$. Dicyandiamide is excellent in that it can impart a high mechanical property and heat resistance to the epoxy resin cured product produced using dicyandiamide as a curing agent, and is widely used as a curing agent for epoxy resins. Examples of the commercial product of such dicyandiamide include DICY7 and DICY15 (all manufactured by Mitsubishi Chemical Corporation).

In the case that the component [F] is used in combination with a component [I] curing accelerator such as an aromatic urea, the curing temperature of the epoxy resin composition can be lowered more than in the case that the component [F] is singly blended. Examples of the component [I] curing accelerator include 3-(3,4-dichlorophenyl)-1,1-dimethylurea (sometimes abbreviated as DCMU), 3-(4-chlorophenyl)-1,1-dimethylurea, phenyldimethylurea (sometimes abbreviated as PDMU), and toluenebisdimethylurea (sometimes abbreviated as TBDMU). Examples of the commercial product of the aromatic urea include DCMU99 (manufactured by Hodogaya Chemical Co., Ltd.), "Omicure (registered trademark)" 24 (manufactured by PTI Japan Limited), and "Dyhard (registered trademark)" UR505 (4,4'-methylene bis (phenyl dimethyl urea), manufactured by CVC Thermoset Specialties).

In Aspects 1 to 4 of the epoxy resin composition according to the present invention, an epoxy resin different from the component [A], the component [B], the component [C], the component [D], and the component [E] may be used as a component [G] as long as an effect of the present invention is not lost.

Examples of such epoxy resin include aniline type epoxy resins, diaminodiphenylmethane type epoxy resins, diaminodiphenylsulfone type epoxy resins, bisphenol A type epoxy resins, bisphenol F type epoxy resins being liquid at 25° C., phenol novolac type epoxy resins, and dicyclopentadiene type epoxy resins. These epoxy resins may be used singly, or in combination of two or more kinds thereof.

Examples of the commercial products of the aniline type epoxy resins include GAN (N,N-diglycidylaniline) and GOT (N,N-diglycidyl-o-toluidine) (all manufactured by Nippon Kayaku Co., Ltd.).

Examples of the commercial products of the diaminodiphenylmethane type epoxy resins include "SUMI-EPOXY (registered trademark)" ELM434 (manufactured by SUMITOMO CHEMICAL COMPANY, LIMITED), YH434L (manufactured by Nippon Steel & Sumikin Chemical Co., Ltd.), "jER (registered trademark)" 604 (manufactured by Mitsubishi Chemical Corporation), and "Araldite (registered trademark)" MY720 and MY721 (all manufactured by Huntsman Advanced Materials LLC.).

Examples of the commercial products of the diaminodiphenylsulfone type epoxy include TG3DAS (manufactured by Konishi Chemical Ind. Co., Ltd.).

Examples of the commercial products of the bisphenol A type epoxy resins include "jER (registered trademark)" 828, 1001, and 1007 (all manufactured by Mitsubishi Chemical Corporation).

Examples of the commercial products of the bisphenol F type epoxy resins being liquid at 25° C. include "EPICLON (registered trademark)" 830 and 807 (all manufactured by Dainippon Ink and Chemicals, Incorporated).

Examples of the commercial products of the phenol novolac type epoxy resins include "jER (registered trademark)" 152, 154, and 180S (all manufactured by Mitsubishi Chemical Corporation).

Examples of the commercial products of the dicyclopentadiene type epoxy resins include HP7200L, HP7200, HP7200H, HP7200HH, and HP7200HHH (all manufactured by DIC Corporation).

furthermore, in Aspects 1 to 3 of the epoxy resin composition according to the present invention, an isocyanuric acid type epoxy resin may be used, and the epoxy resin exemplified as the component [D]-2 described above can be used.

The epoxy resin composition according to the present invention preferably includes a thermoplastic resin as a component [H] for the purpose of adjusting the viscosity to be suitable for the process of manufacturing a fiber-reinforced composite material, adjusting the viscoelasticity to adjust the tag property and the drape property, and enhancing the mechanical property and the toughness of the resin composition. Examples of the thermoplastic resin include polyvinyl acetal resins such as polyvinyl formal and polyvinyl butyral, polyvinyl alcohol, phenoxy resins, polyamides, polyimides, polyvinylpyrrolidone, polysulfone, and polyether sulfone. In particular, Aspect 4 of the epoxy resin composition according to the present invention preferably includes a thermoplastic resin as the component [H], and the thermoplastic resin is more preferably polyether sulfone from the viewpoint that without impairing the flexural modulus and the strength of the resin cured product, another property can be adjusted.

Next, the fiber-reinforced composite material according to the present invention will be described.

The fiber-reinforced composite material according to the present invention includes the prepreg according to the present invention that is cured. Specifically, for example, prepregs including the epoxy resin composition according to the present invention and a reinforcing fiber, that is, the prepregs according to the present invention are stacked, then heated and cured to obtain the fiber-reinforced composite material according to the present invention. The details will be described below.

The epoxy resin composition according to the present invention may be prepared by kneading using a machine such as a kneader, a planetary mixer, a triple roll, or a twin-screw extruder, or by mixing by hand using a beaker, a spatula, or the like as long as uniform kneading is possible.

The prepreg according to the present invention includes the epoxy resin composition according to the present invention and a reinforcing fiber. The prepreg according to the present invention can be produced by, for example, impregnating a reinforcing fiber substrate with the epoxy resin composition prepared by the above-described method. Examples of the method of the impregnation include a hot melt method (dry method). The hot melt method is a method in which a reinforcing fiber is directly impregnated with a thermosetting resin composition having a viscosity reduced by heating, or a method in which a film is prepared in which an epoxy resin composition is coated on release paper or the like, then the film is stacked on both sides or one side of a reinforcing fiber, and the resulting product is heated under pressure to impregnate the reinforcing fiber with the resin. At this time, the fiber mass content of the prepreg can be adjusted by changing the amount of the resin applied to the release paper.

The reinforcing fiber used in the present invention is not particularly limited, and glass fibers, carbon fibers, aramid fibers, boron fibers, alumina fibers, silicon carbide fibers, and the like can be used. Two or more kinds of these fibers may be mixed and used. From the viewpoint of obtaining a lightweight and highly rigid fiber-reinforced composite material, the carbon fibers are preferably used.

As a method of applying heat and pressure in the prepreg lamination molding method, a press molding method, an autoclave molding method, a bagging molding method, a wrapping tape method, an internal pressure molding method, and the like can be appropriately used.

The fiber-reinforced composite material according to the present invention is preferably used for sports applications, aerospace applications, and general industrial applications. More specifically, in sports applications, the fiber-reinforced composite material is preferably used in golf shafts, fishing rods, tennis and badminton rackets, and the like. In aerospace applications, the fiber-reinforced composite material is preferably used in aircraft primary structural materials such as main wings, tail wings, and floor beams, and secondary structural materials such as interior materials. Furthermore, in general industrial applications, the fiber-reinforced composite material is preferably used in structural materials for automobiles, bicycles, ships, railway vehicles, and the like. Among the applications, the fiber-reinforced composite material is preferably used in various structural members by taking advantage of the fact that a fiber-reinforced composite material having high bending strength in the 0° direction and the 90° direction can be obtained.

EXAMPLES

Hereinafter, the present invention will be described more specifically with reference to Examples, but the present invention is not limited to the description in Examples.

The components used in Examples are as follows.
<Material Used>
Component [A]: Trifunctional Amine Type Epoxy Resin
Component [A]-1 "Araldite (registered trademark)" MY0500 (aminophenol type epoxy resin, manufactured by Huntsman Advanced Materials LLC.),
Component [A]-2 "Araldite (registered trademark)" MY0600 (aminophenol type epoxy resin, manufactured by Huntsman Advanced Materials LLC.).
Component [B]: bisphenol F type epoxy resin being solid at 25° C.
Component [B]-1 "Epotohto (registered trademark)" YDF-2001 (manufactured by Tohto Kasei Co., Ltd.),
Component [B]-2 "jER (registered trademark)" 4004P (manufactured by Mitsubishi Chemical Corporation),
Component [B]-3 "Epotohto (registered trademark)" YDF-2004 (manufactured by Tohto Kasei Co., Ltd.),
Component [B]-4 "Epotohto (registered trademark)" YDF-2005RD (manufactured by Tohto Kasei Co., Ltd.),
Component [B]-5 "jER (registered trademark)" 4007P (manufactured by Mitsubishi Chemical Corporation),
Component [B]-6 "jER (registered trademark)" 4010P (manufactured by Mitsubishi Chemical Corporation).
Component [C]: Aromatic Amine Compound
Component [C]-1 SEIKACURE-S(4,4'-diaminodiphenylsulfone, manufactured by SEIKA CORPORATION),
Component [C]-2 3,3'DAS (3,3'-diaminodiphenylsulfone, manufactured by Mitsui Fine Chemicals, Inc.),
Component [C]-3 "Lonzacure (registered trademark)" M-MIPA (4,4'-methylenebis(2-isopropyl-6-methylaniline), manufactured by Lonza),
Component [C]-4 "jERCURE (registered trademark)" W (diethyltoluenediamine, manufactured by Mitsubishi Chemical Corporation).
Component [D]-1: Naphthalene Type Epoxy Resin
"EPICLON" HP-4032D (manufactured by DIC Corporation).
Component [D]-2: Isocyanuric Acid Type Epoxy Resin
"TEPIC"-S (manufactured by Nissan Chemical Corporation).
Component [E]: Sorbitol Type Epoxy Resin
"DENACOL (registered trademark)" EX-614B (manufactured by Nagase ChemteX Corporation).
Component [F]: Dicyandiamide or its Derivative
DICY7 (manufactured by Mitsubishi Chemical Corporation).
Component [G]: Another Epoxy Resin
Component [G]-1 GAN (diglycidylaniline type epoxy resin, manufactured by Nippon Kayaku Co., Ltd.),
Component [G]-2 "SUMI-EPOXY (registered trademark)" ELM434 (diaminodiphenylmethane type epoxy resin, manufactured by SUMITOMO CHEMICAL COMPANY, LIMITED),
Component [G]-3 TG3DAS (diaminodiphenylsulfone type epoxy resin, manufactured by Konishi Chemical Ind. Co., Ltd.),
Component [G]-4 "jER (registered trademark)" 828 (bisphenol A type epoxy resin, manufactured by Mitsubishi Chemical Corporation),
Component [G]-5 "jER (registered trademark)" 1001 (bisphenol A type epoxy resin, manufactured by Mitsubishi Chemical Corporation),
Component [G]-6 "jER (registered trademark)" 1004 (bisphenol A type epoxy resin, manufactured by Mitsubishi Chemical Corporation),
Component [G]-7 "jER (registered trademark)" 154 (phenol novolac type epoxy resin, manufactured by Mitsubishi Chemical Corporation),
Component [G]-8 "EPICLON (registered trademark)" 830 (bisphenol F type epoxy resin, manufactured by Dainippon Ink and Chemicals, Incorporated), Component [G]-9 "EPICLON (registered trademark)" 807 (bisphenol F type epoxy resin, manufactured by Dainippon Ink and Chemicals, Incorporated), Component [G]-10 NER-7604 (polyfunctional bisphenol F type epoxy resin, manufactured by Nippon Kayaku Co., Ltd.), Component [G]-11 EHPE-3150 (solid alicyclic epoxy resin, manufactured by Daicel Corporation), Component [G]-12 AER-4152 (oxazolidone ring type epoxy resin, manufactured by Asahi Kasei E-Materials Corporation).

Component [H]: Thermoplastic Resin

Component [H]-1 "VINYLEC (registered trademark)" K (polyvinyl formal, manufactured by JNC CORPORATION), Component [H]-2 "VINYLEC (registered trademark)" E (polyvinyl formal, manufactured by JNC CORPORATION), Component [H]-3 "SUMIKAEXCEL (registered trademark)" PES2603P (polyether sulfone, manufactured by SUMITOMO CHEMICAL COMPANY, LIMITED), Component [H]-4 "SUMIKAEXCEL (registered trademark)" PES5003P (polyether sulfone, manufactured by SUMITOMO CHEMICAL COMPANY, LIMITED), Component [H]-5 "Virantage (registered trademark)" VW-10700RFP (polyether sulfone, manufactured by Solvay).

Component [I]: Curing Accelerator

DCMU99 (3-(3,4-dichlorophenyl)-1,1-dimethylurea, manufactured by Hodogaya Chemical Co., Ltd.).

<Method of Measuring Average Epoxy Equivalent of Epoxy Resin>

A component [A] or a component [B] was weighed so as to be about 300 mg and put into a glass beaker, and 10 mL of chloroform was further added. The mixture was stirred with a magnetic stirrer until the weighed component was dissolved in the chloroform. To the resulting solution, 20 mL of acetic acid was added, then 10 mL of tetraethylammonium bromide-acetic acid solution (0.4 g/mL acetic acid) was added, and the mixture was stirred. An electrode was immersed in the resulting solution, potentiometric titration was performed with a perchloric acid-acetic acid standard solution (0.1 mol/L), and the average epoxy equivalents of the component [A] and the component [B] were calculated in accordance with JIS K7236 (2001). The average epoxy equivalents are as shown in Tables 1, 2, 6, and 7. Note that in the present description, the word "Table 1" refers to Table 1-1 and Table 1-2. The same applies to the words "Table 2", "Table 6", and "Table 7".

<Method of Preparing Epoxy Resin Composition>

Into a kneader, predetermined amounts of components were put other than a component [C] aromatic amine compound, a component [F] another curing agent, and a component [I] curing accelerator, the temperature was raised to 60 to 150° C., and the mixture was appropriately kneaded until the components were compatible. That is, the temperature was raised to a temperature at which the components were compatible depending on the composition in each of Examples and Comparative Examples, and as a result, it was possible to make the components compatible at a temperature in the range of 60 to 150° C. concerning all the compositions. The temperature was lowered to 60° C., then the component [C] or the component [F] and the component [I] were added, and the mixture was kneaded at 60° C. for 30 minutes to obtain an epoxy resin composition. The epoxy resin composition is as shown in Tables 1 to 8.

<Method of Evaluating Bending Characteristic of Epoxy Resin Cured Product>

An uncured resin composition was degassed in vacuum and then cured at a temperature of 180° C. or 130° C. depending on the kind of the curing agent for 2 hours in a mold that was set to have a thickness of 2 mm with a 2 mm thick "Teflon (registered trademark)" spacer to obtain a plate-shaped resin cured product having a thickness of 2 mm. In the case of using a curing agent that is not used in Examples and Comparative Examples, the curing temperature is appropriately selected from temperatures higher than the temperature at which the exothermic peak appears in the differential scanning calorimetry. From the resin cured product, a test piece having a width of 10 mm and a length of 60 mm was cut out, three-point bending was performed using an Instron universal testing machine (manufactured by Instron) with a span of 32 mm at a crosshead speed of 10 mm/min in accordance with JIS K7171 (1994), and the flexural modulus, the bending strain, and the bending strength were measured. At this time, the values measured for the number of the samples n=6 were employed as the values of the flexural modulus, the bending strain, and the bending strength.

<Method of Evaluating Glass Transition Temperature and Storage Elastic Modulus of Epoxy Resin Cured Product>

An uncured resin composition was degassed in vacuum and then cured at a temperature of 180° C. or 130° C. depending on the kind of the curing agent for 2 hours in a mold that was set to have a thickness of 2 mm with a 2 mm thick "Teflon (registered trademark)" spacer to obtain a plate-shaped resin cured product having a thickness of 2 mm. In the case of using a curing agent that is not used in Examples and Comparative Examples, the curing temperature is appropriately selected from temperatures higher than the temperature at which the exothermic peak appears in the differential scanning calorimetry. From the resin cured product, a test piece having a width of 12.7 mm and a length of 45 mm was cut out, and measurement was performed using a dynamic viscoelasticity measurement device (ARES W/FCO: manufactured by TA Instruments) with the test piece that was set on a solid twisting jig at a temperature rise rate of 5° C./min, a frequency of 1 Hz, and a strain amount of 0.08% in a temperature range of 40 to 260° C. At this time, in the obtained graph of the storage elastic modulus and the temperature, the temperature at the intersection of the tangent line drawn in the glass state and the tangent line drawn in the glass transition temperature region was regarded as the glass transition temperature. In the obtained graph of the storage elastic modulus and the temperature, the storage elastic modulus at a temperature higher than the glass transition temperature by 50° C. was regarded as the storage elastic modulus in a rubber state.

<Method of Preparing Prepreg>

The epoxy resin composition obtained in accordance with <Method of Preparing Epoxy Resin Composition> described above was applied to release paper using a knife coater to prepare two resin films having a predetermined basis weight.

The basis weight of the resin film was adjusted to be 39 g/m$^2$. Next, the obtained two resin films were stacked on both faces of the carbon fiber "TORAYCA (registered trademark)" T700S-12K-60E (manufactured by Toray Industries, Inc., basis weight: 150 g/m$^2$) arranged in one direction in a sheet shape, the resulting product was heated under pressure at a temperature of 110° C. and a pressure of 2 MPa to impregnate the carbon fiber with the epoxy resin composition, and a unidirectional prepreg was obtained. The fiber mass content of the obtained prepreg was 67%.

<Method of Measuring Composite Property>

(1) Bending Strength in 0° Direction of CFRP

The fiber directions of the unidirectional prepregs prepared by <Method of Preparing Prepreg> described above were aligned, 13 plies of the unidirectional prepregs were stacked and molded with an autoclave at a temperature of 180° C. or 130° C. for 2 hours under a pressure of 0.6 MPa at a temperature rise rate of 1.7° C./min to prepare a unidirectional CFRP having a thickness of 2 mm. From this laminated plate, a test piece was cut out so as to have a width of 15 mm and a length of 100 mm, and was subjected to three-point bending using an Instron universal testing machine (manufactured by Instron) in accordance with JIS K7017 (1988). Measurement was performed at a crosshead speed of 5.0 mm/min with a span of 80 mm using an indenter having a diameter of 10 mm and supporting points having a diameter of 4 mm to measure the bending strength. The bending strength in the 0° direction was measured for 6 samples, the measured value was converted into a value at which the fiber mass content was 60% by mass, and the average of the converted values was determined as the bending strength in the 0° direction.

(2) Bending Strength in 90° Direction of CFRP

A unidirectional CFRP was prepared in the same manner as in (1) described above. From the obtained unidirectional laminated plate having a thickness of 2 mm, a test piece was cut out so as to have a width of 15 mm and a length of 60 mm, and was subjected to three-point bending using an Instron universal testing machine (manufactured by Instron) in accordance with JIS K7017 (1988). Measurement was performed at a crosshead speed of 1.0 mm/min with a span of 40 mm using an indenter having a diameter of 10 mm and supporting points having a diameter of 4 mm to measure the bending strength. The bending strength in the 90° direction was measured for 6 samples, the measured value was converted into a value at which the fiber mass content was 60% by mass, and the average of the converted values was determined as the bending strength in the 90° direction.

(3) Method of Evaluating Interlaminar Toughness Value $G_{1c}$ The fiber directions of the unidirectional prepregs prepared by <Method of Preparing Prepreg> described above were aligned, 13 plies of the unidirectional prepregs were stacked, and 2 pairs of laminated bodies were prepared. "TOYOFLON (registered trademark)" E (manufactured by Toray Industries, Inc.) was sandwiched between the laminated bodies along the fiber direction for 40 mm from the end portion, and the resulting product was molded with an autoclave at a temperature of 180° C. or 130° C. for 2 hours under a pressure of 0.6 MPa at a temperature rise rate of 1.7° C./min to prepare a unidirectional CFRP having a thickness of 3 mm. In the case of using a curing agent that is not used in Examples and Comparative Examples, the curing temperature is appropriately selected from temperatures higher than the temperature at which the exothermic peak appears in the differential scanning calorimetry. From the laminated plate, a test piece was cut out so as to have a width of 20 mm and a length of 200 mm, an aluminum block was adhered, so as to be perpendicular to the fiber direction, to the end portion where the film was inserted, and a double cantilever beam test was performed using an Instron universal testing machine (manufactured by Instron) in accordance with JIS K7086 (1993). The measurement was performed at a crosshead speed of 1.0 mm/min to measure the fracture toughness value. The fracture toughness value was measured for 6 samples, and the average of the measured values was determined as $G_{1c}$.

(4) Method of Evaluating Interlaminar Toughness Value $G_{2c}$

A CFRP was prepared in the same manner as described in (3) Method of Evaluating $G_{1c}$ above. From this laminated plate, a test piece was cut out so as to have a width of 20 mm and a length of 400 mm, and was subjected to an end notched flexure test by three-point bending using an Instron universal testing machine (manufactured by Instron) in accordance with JIS K7086 (1993). Measurement was performed at a crosshead speed of 0.5 mm/min with a span of 100 mm using an indenter having a diameter of 10 mm and supporting points having a diameter of 4 mm to measure the fracture toughness value. The fracture toughness value was measured for 6 samples, and the average of the measured values was determined as $G_2c$.

Example 1

An epoxy resin composition was prepared in accordance with <Method of Preparing Epoxy Resin Composition> described above using, as an epoxy resin, 10 parts by mass of "Araldite (registered trademark)" MY0500, 45 parts by mass of "Araldite (registered trademark)" MY0600, 18 parts by mass of "Epotohto (registered trademark)" YDF-2004, 10 parts by mass of "SUMI-EPOXY (registered trademark)" ELM434, and 17 parts by mass of EPICLON (registered trademark) 830, 41.5 parts by mass of SEIKACURE-S as an aromatic amine compound, and 5.0 parts by mass of "VINYLEC (registered trademark)" K as a thermoplastic resin.

The average epoxy equivalents of the component [A] and the component [B] were measured in accordance with <Method of Measuring Average Epoxy Equivalent of Epoxy Resin>, and as a result, the average epoxy equivalent of the component [A] was 117 g/eq and that of the component [B] was 980 g/eq. The value of average epoxy equivalent of component [B]/average epoxy equivalent of component [A] shown in Formula (1) was 8.4.

Using this epoxy resin composition, the bending characteristics of the epoxy resin cured product were obtained. The epoxy resin cured product was cured at 180° C. in accordance with <Method of Evaluating Bending Characteristic of Epoxy Resin Cured Product>. As a result, the flexural modulus was 4.7 GPa, the bending strength was 205 MPa, and the bending strain amount was 6.9%.

The glass transition temperature and the storage elastic modulus in a rubber state were measured in accordance with <Method of Evaluating Glass Transition Temperature and Storage Elastic Modulus of Epoxy Resin Cured Product>, and as a result, the glass transition temperature was 175° C., and the storage elastic modulus in a rubber state was 10.0 MPa. In the relationship between the glass transition temperature (X) and the storage elastic modulus in a rubber state (Y) shown in Formula (2) (Formula (2): $0.087X-6 \leq Y \leq 0.087X-4$), X=175° C., and therefore, $9.2 \leq Y \leq 11.2$, so that the storage elastic modulus in a rubber state of the epoxy resin cured product satisfied the range shown in Formula (2).

The storage elastic modulus in a rubber state was measured in accordance with <Method of Evaluating Glass Transition Temperature and Storage Elastic Modulus of Epoxy Resin Cured Product>, and as a result, the storage elastic modulus in a rubber state was 10.0 MPa, and the ratio of the storage elastic modulus in a rubber state (Y) to the active epoxy group mole number in 100 parts by mass of all the epoxy resins (Ma) (Y/Ma) shown in Formula (3) was 1,489.

From the obtained epoxy resin composition, a prepreg having a fiber mass content of 67% by mass was prepared in accordance with <Method of Preparing Prepreg>, and 13 plies of the obtained prepregs were stacked and cured at 180° C. to prepare a unidirectional fiber-reinforced composite material (CFRP).

The mechanical properties of the CFRP were measured, and the results were good that the bending strength in the 0° direction was 1,810 MPa and the bending strength in the 90° direction was 132 MPa.

The interlaminar toughness of the CFRP was evaluated, and as a result, $G_{1c}$ showed a good value of 520 J/m$^2$ and $G_{2c}$ showed a good value of 610 J/m$^2$.

Examples 2 to 15

An epoxy resin composition, a prepreg, a resin cured product, and a CFRP were prepared in the same manner as in Example 1 except that the resin composition was changed as shown in Tables 1 and 2, and the bending characteristics of the resin cured product, average epoxy equivalent of component [B]/average epoxy equivalent of component [A](Formula (1)), the relationship between the glass transition temperature and the storage elastic modulus in a rubber state (Formula (2)), and the relationship 1100 Y/Ma 2000 (Formula (3)) were obtained. As a result, all of Formulae (1) to (3) were satisfied.

The bending characteristics and the CFRP properties of the epoxy resin composition in each Example were evaluated, and as a result, good physical properties were obtained at all levels.

Examples 16 to 38

An epoxy resin composition and a prepreg were prepared in the same manner as in Example 1 except that the resin composition was changed as shown in Tables 3 to 5. An epoxy resin cured product was obtained by curing at 130° C. in accordance with <Method of Evaluating Bending Characteristic of Epoxy Resin Cured Product> described above, and a CFRP was obtained in accordance with <Method of Evaluating Composite Property> described above.

The bending characteristics and the CFRP properties of the epoxy resin composition in each Example were evaluated, and as a result, good physical properties were obtained at all levels.

Comparative Example 1

Using the resin composition shown in Table 6-1, an epoxy resin composition and a prepreg were prepared in the same manner as in Example 1.

The value in Formula (1) was 20.1, and the bending characteristics of the epoxy resin cured product were obtained. The epoxy resin cured product was cured at 130° C. in accordance with <Method of Evaluating Bending Characteristic of Epoxy Resin Cured Product>. As a result, the flexural modulus of the resin cured product was 4.5 GPa, and the bending strength was as low as 180 MPa.

The glass transition temperature and the storage elastic modulus in a rubber state were obtained in the same manner as in Example 1. The relationship shown in Formula (2) was examined using this epoxy resin cured product. As a result, Formula (2) was not satisfied, the glass transition temperature was 93° C., and the bending strain amount was as low as 4.3%. Furthermore, the relationship shown in Formula (3) was examined using this epoxy resin cured product, and as a result, Formula (3) was not satisfied.

From the obtained epoxy resin composition, a prepreg having a fiber mass content of 67% by mass was prepared in accordance with <Method of Preparing Prepreg>, and 13 plies of the obtained prepregs were stacked and cured at 130° C. to prepare a unidirectional fiber-reinforced composite material (CFRP).

The mechanical properties of the CFRP were measured. As a result, the bending strength in the 0° direction was 1,701 MPa, the bending strength in the 90° direction was 113 MPa, and the bending strength in the 90° direction was low.

Furthermore, the interlaminar toughness of the CFRP was evaluated, and the results were insufficient that $G_{1c}$ was 228 J/m$^2$ and $G_{2c}$ was 483 J/m$^2$.

Comparative Examples 2 to 3

Using the resin composition shown in Table 6-1, an epoxy resin composition, a prepreg, a resin cured product, and a CFRP were prepared in the same manner as in Comparative Example 1, and the bending characteristics of the resin cured product, the relationships shown in Formulae (2) and (3), and the properties of the CFRP were obtained. Each epoxy resin composition includes no component [B]. Because each resin cured product did not satisfy the relationships shown in Formulae (2) and (3), the resin cured product had low flexural modulus and insufficient heat resistance. Furthermore, the bending characteristics and the interlaminar toughness value of the CFRP were insufficient.

Comparative Example 4

Using the resin composition shown in Table 6-2, an epoxy resin composition, a prepreg, a resin cured product, and a CFRP were prepared in the same manner as in Comparative Example 1, and the bending characteristics of the resin cured product, the relationships shown in Formulae (2) and (3), and the properties of the CFRP were obtained. The epoxy resin composition includes no component [B]. The resin cured product did not satisfy the relationships shown in Formulae (2) and (3), and the glass transition temperature was 170° C.

The flexural modulus was as low as 3.7 GPa, the bending strain amount was as low as 5.8%, and the bending strength was as low as 181 MPa. The bending strength in the 0° direction and the 90° direction and the interlaminar toughness value of the CFRP were also low.

Comparative Example 5

Using the resin composition shown in Table 6-2, an epoxy resin composition, a prepreg, a resin cured product, and a CFRP were prepared in the same manner as in Comparative Example 1, and the bending characteristics of the resin cured product, the relationships shown in Formulae (2) and (3), and the properties of the CFRP were obtained. The epoxy resin composition includes no component [B], and includes 40 parts by mass of bisphenol F being liquid at 25° C. The resin cured product did not satisfy the relationships shown in Formulae (2) and (3), and the flexural modulus, the bending strain amount, and the bending strength were insufficient.

Furthermore, the bending strength in the 90° direction of the CFRP was as low as 98 MPa, and the interlaminar toughness value was also insufficient.

Comparative Example 6

Using the resin composition shown in Table 6-2, an epoxy resin composition, a prepreg, a resin cured product, and a CFRP were prepared in the same manner as in Comparative Example 1, and the bending characteristics of the resin cured product, the relationships shown in Formulae (2) and (3), and the properties of the CFRP were obtained. In the epoxy resin composition, the average epoxy equivalent of the component [B] is 2,273 g/eq, and the resin cured product does not satisfy the relationships shown in Formulae (2) and (3). The flexural modulus of the resin cured product was 4.5 GPa, and the bending strength was as low as 180 MPa, so that the CFRP had an insufficient bending strength in the 90° direction of 89 MPa.

Furthermore, the interlaminar toughness of the CFRP was evaluated, and the results were insufficient that $G_{1c}$ was 199 J/m² and $G_2c$ was 365 J/m².

Comparative Example 7

Using the resin composition shown in Table 7-1, an epoxy resin composition, a prepreg, a resin cured product, and a CFRP were prepared in the same manner as in Comparative Example 1, and the bending characteristics of the resin cured product, the relationships shown in Formulae (2) and (3), and the properties of the CFRP were obtained. In the epoxy resin composition, the average epoxy equivalent of the component [B] was 4,190 g/eq, and the resin cured product did not satisfy Formulae (2) and (3). Therefore, the bending strain amount was low, and the bending strength in the 0° direction and the 90° direction and the interlaminar toughness value of the CFRP were insufficient.

Comparative Example 8

Using the resin composition shown in Table 7-1, an epoxy resin composition, a prepreg, a resin cured product, and a CFRP were prepared in the same manner as in Comparative Example 1, and the bending characteristics of the resin cured product, the relationships shown in Formulae (2) and (3), and the properties of the CFRP were obtained. In the epoxy resin composition, the average epoxy equivalent of the component [B] was 480 g/eq, the resin cured product did not satisfy Formulae (2) and (3), the flexural modulus was insufficient, and the bending strength in the 0° direction and the 90° direction and the interlaminar toughness value of the CFRP were also low. The heat resistance was also insufficient.

Comparative Example 9

Using the resin composition shown in Table 7-1, an epoxy resin composition, a prepreg, a resin cured product, and a CFRP were prepared in the same manner as in Comparative Example 1, and the bending characteristics of the resin cured product, the relationships shown in Formulae (2) and (3), and the properties of the CFRP were obtained. The epoxy resin composition includes no component [B], and includes 40 parts by mass of a bisphenol A type epoxy resin being solid at 25° C. The resin cured product did not satisfy the relationships shown in Formulae (2) and (3), and had a high glass transition temperature of 180° C. and a low flexural modulus of 4.0 GPa. The bending strength in the 0° direction and the 90° direction and the interlaminar toughness value of the CFRP were also insufficient.

Comparative Example 10

Using the resin composition shown in Table 7-2, an epoxy resin composition, a prepreg, a resin cured product, and a CFRP were prepared in the same manner as in Comparative Example 1, and the bending characteristics of the resin cured product, the relationships shown in Formulae (2) and (3), and the properties of the CFRP were obtained. The epoxy resin composition includes no component [B], and includes 30 parts by mass of a bisphenol A type epoxy resin being solid at 25° C. The resin cured product did not satisfy Formulae (2) and (3), and did not satisfy Formula (1). The flexural modulus and the bending strength were low. The bending strength and the interlaminar toughness value of the CFRP were also insufficient.

Comparative Example 11

Using the resin composition shown in Table 7-2, an epoxy resin composition, a prepreg, a resin cured product, and a CFRP were prepared in the same manner as in Comparative Example 1, and the bending characteristics of the resin cured product, the relationships shown in Formulae (2) and (3), and the properties of the CFRP were obtained. The epoxy resin composition includes no component [A], and includes 60 parts by mass of ELM434 being a tetrafunctional glycidyl amine type epoxy resin. The resin cured product did not satisfy the relationships shown in Formulae (1) and (2), and had a high glass transition temperature of 190° C., a low flexural modulus of 4.0 GPa, and a low bending strength of 160 MPa. The bending strength and the interlaminar toughness value of the CFRP were also insufficient.

Comparative Examples 12 and 13

Using the resin composition shown in Table 8, a resin cured product and a CFRP were prepared in the same manner as in Example 16, and the bending characteristics were evaluated.

Because no component [E] was included in Comparative Example 12, the flexural modulus and the strain were insufficient, and the bending strength was also insufficient.

In Comparative Example 13, no component [A] was included, and the flexural modulus was insufficient. As a result, the bending strength was also insufficient. The physical properties in the 0° direction and the 90° direction of the CFRP were also low.

Comparative Example 14

Using the resin composition shown in Table 8, a resin cured product and a CFRP were prepared in the same manner as in Example 16, and the bending characteristics were evaluated. In the resin composition, the total content of the component [A] and the component [E] was less than 40 parts by mass, and both the flexural modulus and the strain were insufficient, so that the bending strength was insufficient.

The bending characteristics of the CFRP were also insufficient.

Comparative Example 15

Using the resin composition shown in Table 8, a resin cured product and a CFRP were prepared in the same manner as in Example 16, and the bending characteristics were evaluated.

Both the flexural modulus and the strain were insufficient, so that the bending strength was insufficient. The bending characteristics of the CFRP were also insufficient.

Comparative Example 16

Using the resin composition shown in Table 8, a resin cured product and a CFRP were prepared in the same manner as in Example 16, and the bending characteristics were evaluated. The balance between the flexural modulus and the strain was poor, and the bending strength was insufficient. The bending characteristics of the CFRP were also insufficient.

TABLE 1-1

| | Component | | Example 1 | Example 2 | Example 3 | Example 4 |
|---|---|---|---|---|---|---|
| Component [A] trifunctional amine type epoxy resin | "Araldite ®""MY0500" | Aminophenol type epoxy resin | 10 | | | |
| | "Araldite ®""MY0600" | | 45 | 55 | 60 | 65 |
| Component [B] bisphenol F type epoxy resin being solid at 25° C. | "jER ®""4004P" | Bisphenol F type epoxy resin | | | | |
| | "Epotohto ®""YDF2004" | | 18 | 18 | 22 | 22 |
| Component [G] another epoxy resin | GAN | Difunctional glycidyl amine type epoxy resin | | | 8 | 5 |
| | "SUMI-EPOXY ®""ELM434 TG3DAS" | Tetrafunctional glycidyl amine type epoxy resin | 10 | | | |
| | "EPICLON ®""830" | Bisphenol F type epoxy resin | 17 | 27 | 10 | 8 |
| Component [D]-2 isocyanuric acid type epoxy resin | "TEPIC ®""-S" | Isocyanuric acid type epoxy resin | | | | |
| Component [C] aromatic amine compound | SEIKACURE-S | 4,4'-diaminodiphenylsulfone | 41.5 | | | |
| | 3,3'-DAS | 3,3'-diaminodiphenylsulfone | | 40 | 40.5 | 41 |
| | "Lonzacure ®""M-MIPA" | 4,4'-methylenebis(2-isopropyl-6-methylaniline) | | | | |
| Component [H] thermoplastic resin | "VINYLEC ®""K" | Polyvinyl formal | 5 | 5 | 5 | 5 |
| | "SUMIKAEXCEL ®"" PES5003P" | Polyether sulfone | | | | |
| Average epoxy equivalent of component [B] (g/eq) | | | 980 | 980 | 980 | 980 |
| Average epoxy equivalent of component [A] (g/eq) | | | 117 | 118 | 118 | 118 |
| Formula (1): average epoxy equivalent of component [B]/average epoxy equivalent of component [A] (Eb/Ea) | | | 8.4 | 8.3 | 8.3 | 8.3 |
| Active group mole number in epoxy resin/active hydrogen mole number of component [C] (Ma/Mc) | | | 1.00 | 1.00 | 1.00 | 1.00 |
| Resin cured product properties | Glass transition temperature (° C.): X | | 175 | 175 | 170 | 172 |
| | Storage elastic modulus in rubber state (MPa): Y | | 10.0 | 10.5 | 10.0 | 10.1 |
| | Formula (2): $0.087X - 6 \leq Y \leq 0.087X - 4$ | | $9.2 \leq Y \leq 11.2$ | $9.2 \leq Y \leq 11.2$ | $8.8 \leq Y \leq 10.8$ | $9.0 \leq Y \leq 11.0$ |
| | Formula (3): Storage elastic modulus in rubber state/active group mole number in epoxy resin (Y/Ma) | | 1489 | 1627 | 1529 | 1529 |
| | Flexural modulus (GPa) | | 4.7 | 4.9 | 5.0 | 5.2 |
| | Bending strength (MPa) | | 205 | 215 | 225 | 230 |
| | Bending strain (%) | | 6.9 | 7.0 | 7.1 | 7.2 |
| Composite properties | Bending strength in 0° direction (MPa) | | 1810 | 1871 | 1860 | 1920 |
| | Bending strength in 90° direction (MPa) | | 132 | 162 | 153 | 157 |
| | $G_{1C}$ (J/m$^2$) | | 520 | 547 | 550 | 523 |
| | $G_{2C}$ (J/m$^2$) | | 610 | 672 | 730 | 670 |

TABLE 1-2

| | Component | | Example 5 | Example 6 | Example 7 | Example 8 |
|---|---|---|---|---|---|---|
| Component [A] trifunctional amine type epoxy resin | "Araldite ®""MY0500" | Aminophenol type epoxy resin | 15 | 15 | 15 | 15 |
| | "Araldite ®""MY0600" | | 30 | 30 | 30 | 30 |
| Component [B] bisphenol F type epoxy resin being solid at 25° C. | "jER ®""4004P" | Bisphenol F type epoxy resin | | | 18 | |
| | "Epotohto ®""YDF2004" | | 18 | 18 | | 18 |
| Component [G] another epoxy resin | GAN | Difunctional glycidyl amine type epoxy resin | | | 7 | |
| | "SUMI-EPOXY ®""ELM434 TG3DAS" | Tetrafunctional glycidyl amine type epoxy resin | 10 | 10 | 10 | 10 |
| | "EPICLON ®""830" | Bisphenol F type epoxy resin | 22 | 22 | 20 | 22 |

TABLE 1-2-continued

|  | Component |  | Example 5 | Example 6 | Example 7 | Example 8 |
|---|---|---|---|---|---|---|
| Component [D]-2 isocyanuric acid type epoxy resin | "TEPIC ®"-S | Isocyanuric acid type epoxy resin | 5 | 5 |  | 5 |
| Component [C] aromatic amine compound | SEIKACURE-S | 4,4'-diaminodiphenylsulfone |  |  |  |  |
|  | 3,3'-DAS | 3,3'-diaminodiphenylsulfone |  |  |  |  |
|  | "Lonzacure ®"M-MIPA | 4,4'-methylenebis(2-isopropyl-6-methylaniline) | 55 | 48 | 51 | 27.5 |
| Component [H] thermoplastic resin | "VINYLEC ®"K | Polyvinyl formal |  |  |  |  |
|  | "SUMIKAEXCEL ®" PES5003P | Polyether sulfone | 4 | 4 | 4 | 4 |
| Average epoxy equivalent of component [B] (g/eq) |  |  | 980 | 980 | 980 | 980 |
| Average epoxy equivalent of component [A] (g/eq) |  |  | 116 | 116 | 116 | 116 |
| Formula (1): average epoxy equivalent of component [B]/average epoxy equivalent of component [A] (Eb/Ea) |  |  | 8.4 | 8.4 | 7.3 | 8.4 |
| Active group mole number in epoxy resin/active hydrogen mole number of component [C] (Ma/Mc) |  |  | 0.93 | 1.07 | 1.00 | 1.07 |
| Resin cured product properties | Glass transition temperature (° C.): X |  | 157 | 150 | 169 | 150 |
|  | Storage elastic modulus in rubber state (MPa): Y |  | 8.0 | 7.4 | 9.4 | 7.3 |
|  | Formula (2): $0.087X - 6 \leq Y \leq 0.087X - 4$ |  | $7.7 \leq Y \leq 9.7$ | $7.1 \leq Y \leq 9.1$ | $8.7 \leq Y \leq 10.7$ | $7.1 \leq Y \leq 9.1$ |
|  | Formula (3): Storage elastic modulus in rubber state/active group mole number in epoxy resin (Y/Ma) |  | 1213 | 1122 | 1432 | 1107 |
|  | Flexural modulus (GPa) |  | 4.4 | 4.5 | 4.5 | 4.5 |
|  | Bending strength (MPa) |  | 196 | 193 | 205 | 195 |
|  | Bending strain (%) |  | 6.1 | 6.0 | 6.7 | 6.1 |
| Composite properties | Bending strength in 0° direction (MPa) |  | 1750 | 1727 | 1781 | 1790 |
|  | Bending strength in 90° direction (MPa) |  | 131 | 133 | 130 | 127 |
|  | $G_{1C}$ (J/m²) |  | 512 | 497 | 510 | 495 |
|  | $G_{2C}$ (J/m²) |  | 597 | 581 | 607 | 590 |

TABLE 2-1

|  | Component |  | Example 9 | Example 10 | Example 11 | Example 12 |
|---|---|---|---|---|---|---|
| Component [A] trifunctional amine type epoxy resin | "Araldite ®"MY0500 | Aminophenol type epoxy resin | 15 | 15 | 15 | 15 |
|  | "Araldite ®"MY0600 |  | 30 | 30 | 30 | 30 |
| Component [B] bisphenol F type epoxy resin being solid at 25° C. | "jER ®"4004P | Bisphenol F type epoxy resin | 18 | 18 | 18 |  |
|  | "Epotohto ®"YDF2004 |  |  |  |  | 18 |
| Component [G] another epoxy resin | GAN | Difunctional glycidyl amine type epoxy resin | 7 | 7 | 7 |  |
|  | TG3DAS | Tetrafunctional glycidyl amine type epoxy resin | 10 | 10 | 10 | 10 |
|  | "EPICLON ®"830 | Bisphenol F type epoxy resin | 20 | 20 | 20 | 22 |
| Component [D]-2 isocyanuric acid type epoxy resin | "TEPIC ®"-S | Isocyanuric acid type epoxy resin |  |  |  | 5 |
| Component [C] aromatic amine compound | SEIKACURE-S | 4,4'-diaminodiphenylsulfone |  | 37.0 | 45.0 | 41.0 |
|  | 3,3'-DAS | 3,3'-diaminodiphenylsulfone |  |  |  |  |
|  | "jER ®"CURE W | Diethyltoluenediamine | 29.2 |  |  |  |
| Component [H] thermoplastic resin | "VINYLEC ®"K | Polyvinyl formal |  |  |  |  |
|  | "SUMIKAEXCEL ®" PES5003P | Polyether sulfone | 4 | 4 | 4 | 4 |
| Average epoxy equivalent of component [B] (g/eq) |  |  | 850 | 850 | 850 | 980 |
| Average epoxy equivalent of component [A] (g/eq) |  |  | 116 | 116 | 116 | 116 |
| Formula (1): average epoxy equivalent of component [B]/average epoxy equivalent of component [A] (Eb/Ea) |  |  | 7.3 | 7.3 | 7.3 | 8.4 |
| Active group mole number in epoxy resin/active hydrogen mole number of component [C] (Ma/Mc) |  |  | 1.00 | 1.10 | 0.90 | 1.00 |
| Resin cured product properties | Glass transition temperature (° C.): X |  | 157 | 155 | 167 | 175 |
|  | Storage elastic modulus in rubber state (MPa): Y |  | 9.0 | 7.6 | 8.7 | 10.5 |
|  | Formula (2): $0.087X - 6 \leq Y \leq 0.087X - 4$ |  | $7.7 \leq Y \leq 9.7$ | $7.5 \leq Y \leq 9.5$ | $8.5 \leq Y \leq 10.5$ | $9.2 \leq Y \leq 11.2$ |
|  | Formula (3): Storage elastic modulus in rubber state/active group mole number in epoxy resin (Y/Ma) |  | 1371 | 1158 | 1326 | 1593 |
|  | Flexural modulus (GPa) |  | 4.5 | 4.7 | 4.4 | 4.5 |
|  | Bending strength (MPa) |  | 200 | 198 | 195 | 208 |
|  | Bending strain (%) |  | 6.4 | 6.0 | 6.1 | 6.9 |

TABLE 2-1-continued

| Component | | Example 9 | Example 10 | Example 11 | Example 12 |
|---|---|---|---|---|---|
| Composite properties | Bending strength in 0° direction (MPa) | 1775 | 1801 | 1760 | 1780 |
| | Bending strength in 90° direction (MPa) | 131 | 135 | 125 | 139 |
| | $G_{1C}$ (J/m$^2$) | 513 | 520 | 510 | 541 |
| | $G_{2C}$ (J/m$^2$) | 618 | 640 | 622 | 630 |

TABLE 2-2

| Component | | | Example 13 | Example 14 | Example 15 |
|---|---|---|---|---|---|
| Component [A] trifunctional amine type epoxy resin | "Araldite ®""MY0500" "Araldite ®""MY0600" | Aminophenol type epoxy resin | 80 | 40 | 20 |
| Component [B] bisphenol F type epoxy resin being solid at 25° C. | "jER ®""4004P" "Epotohto ®""YDF2004" | Bisphenol F type epoxy resin | 10 | 40 | 25 |
| Component [G] another epoxy resin | GAN | Difunctional glycidyl amine type epoxy resin | | 20 | 5 |
| | TG3DAS | Tetrafunctional glycidyl amine type epoxy resin | | | |
| | "EPICLON ®""830" | Bisphenol F type epoxy resin | 10 | | 20 |
| Component [D]-2 isocyanuric acid type epoxy resin | "TEPIC ®""-S" | Isocyanuric acid type epoxy resin | | | 25 |
| Component [C] aromatic amine compound | SEIKACURE-S | 4,4'-diaminodiphenylsulfone | | 31.0 | |
| | 3,3'-DAS | 3,3'-diaminodiphenylsulfone | 46.5 | | 37 |
| | "jER ®""CURE W" | Diethyltoluenediamine | | | |
| Component [H] thermoplastic resin | "VINYLEC ®""K" | Polyvinyl formal | | 5 | 5 |
| | "SUMIKAEXCEL ®" PES5003P | Polyether sulfone | 4 | | |
| Average epoxy equivalent of component [B] (g/eq) | | | 980 | 850 | 850 |
| Average epoxy equivalent of component [A] (g/eq) | | | 118 | 118 | 118 |
| Formula (1): average epoxy equivalent of component [B]/average epoxy equivalent of component [A] (Eb/Ea) | | | 8.3 | 7.2 | 7.2 |
| Active group mole number in epoxy resin/active hydrogen mole number of component [C] (Ma/Mc) | | | 1.00 | 1.09 | 1.01 |
| Resin cured product properties | Glass transition temperature (° C.): X | | 173 | 140 | 185 |
| | Storage elastic modulus in rubber state (MPa): Y | | 9.2 | 6.3 | 11.9 |
| | Formula (2): 0.087X − 6 ≤ Y ≤ 0.087X − 4 | | 9.1 ≤ Y ≤ 11.1 | 6.2 ≤ Y ≤ 8.2 | 10.1 ≤ Y ≤ 12.1 |
| | Formula (3): Storage elastic modulus in rubber state/active group mole number in epoxy resin (Y/Ma) | | 1230 | 1156 | 1966 |
| | Flexural modulus (GPa) | | 5.1 | 4.5 | 4.5 |
| | Bending strength (MPa) | | 200 | 194 | 194 |
| | Bending strain (%) | | 6.0 | 6.0 | 6.1 |
| Composite properties | Bending strength in 0° direction (MPa) | | 1900 | 1760 | 1782 |
| | Bending strength in 90° direction (MPa) | | 135 | 133 | 127 |
| | $G_{1C}$ (J/m$^2$) | | 510 | 528 | 529 |
| | $G_{2C}$ (J/m$^2$) | | 642 | 600 | 613 |

TABLE 3

| Component | | | Example 16 | Example 17 | Example 18 | Example 19 |
|---|---|---|---|---|---|---|
| Component [A] trifunctional amine type epoxy resin | "Araldite ®""MY0500" "Araldite ®""MY0600" | Aminophenol type epoxy resin | 30 | 70 | 50 | 50 |
| Component [E] sorbitol type epoxy resin | "DENACOL ®""EX-614B" | Sorbitol type epoxy resin | 10 | 10 | 10 | 10 |
| Component [B] bisphenol F type epoxy resin being solid at 25° C. | "Epotohto ®""YDF2001" "jER ®""4007P" | Bisphenol F type epoxy resin | | | | |

TABLE 3-continued

|  | Component |  | | | | |
|---|---|---|---|---|---|---|
| Component [G] another epoxy resin | "jER ®"828 | Bisphenol A type epoxy resin |  |  | 20 |  |
|  | "EPICLON ®"830 | Bisphenol F type epoxy resin | 60 | 20 | 20 | 20 |
|  | "jER ®"154 | Phenol novolac type epoxy resin |  |  |  | 20 |
| Component [F] dicyandiamide or its derivative | DICY7 | Dicyandiamide | 8.3 | 10.1 | 9.0 | 9.1 |
| Component [I] curing accelerator thermoplastic resin | DCMU99 | Dichlorodimethylurea | 5.4 | 6.5 | 6.0 | 5.9 |
| Total content of component [A] and component [E] | | | 40 | 80 | 60 | 60 |
| Resin cured product properties | Flexural modulus (GPa) | | 4.3 | 4.9 | 4.4 | 4.5 |
|  | Bending strength (MPa) | | 190 | 194 | 195 | 195 |
|  | Bending strain (%) | | 6.9 | 5.0 | 6.3 | 6.2 |
|  | Glass transition temperature (° C.) | | 125 | 153 | 150 | 154 |
| Composite properties | Bending strength in 0° direction (MPa) | | 1751 | 1863 | 1760 | 1770 |
|  | Bending strength in 90° direction (MPa) | | 137 | 130 | 133 | 137 |

|  | Component |  | Example 20 | Example 21 | Example 22 | Example 23 |
|---|---|---|---|---|---|---|
| Component [A] trifunctional amine type epoxy resin | "Araldite ®"MY0500 | Aminophenol type epoxy resin | 40 |  |  | 50 |
|  | "Araldite ®"MY0600 |  |  | 40 | 50 |  |
| Component [E] sorbitol type epoxy resin | "DENACOL ®"EX-614B | Sorbitol type epoxy resin | 35 | 35 | 50 | 50 |
| Component [B] bisphenol F type epoxy resin being solid at 25° C. | "Epotohto ®"YDF2001 "jER ®"4007P | Bisphenol F type epoxy resin | 15 | 15 |  |  |
| Component [G] another epoxy resin | "jER ®"828 | Bisphenol A type epoxy resin | 10 | 10 |  |  |
|  | "EPICLON ®"830 | Bisphenol F type epoxy resin |  |  |  |  |
|  | "jER ®"154 | Phenol novolac type epoxy resin |  |  |  |  |
| Component [F] dicyandiamide or its derivative | DICY7 | Dicyandiamide | 7.2 | 7.4 | 9.1 | 8.9 |
| Component [I] curing accelerator | DCMU99 | Dichlorodimethylurea | 4.7 | 4.8 | 6.0 | 5.8 |
| Total content of component [A] and component [E] | | | 75 | 75 | 100 | 100 |
| Resin cured product properties | Flexural modulus (GPa) | | 4.4 | 4.4 | 5 | 4.6 |
|  | Bending strength (MPa) | | 194 | 196 | 205 | 199 |
|  | Bending strain (%) | | 6.7 | 6.7 | 6.6 | 6.7 |
|  | Glass transition temperature (° C.) | | 131 | 117 | 126 | 136 |
| Composite properties | Bending strength in 0° direction (MPa) | | 1770 | 1765 | 1880 | 1800 |
|  | Bending strength in 90° direction (MPa) | | 140 | 141 | 148 | 140 |

TABLE 4

|  | Component |  | Example 24 | Example 25 | Example 26 | Example 27 |
|---|---|---|---|---|---|---|
| Component [A] trifunctional amine type epoxy resin | "Araldite ®"MY0600 | Aminophenol type epoxy resin | 50 | 70 | 50 | 50 |
| Component [E] sorbitol type epoxy resin | "DENACOL ®"EX-614B | Sorbitol type epoxy resin | 25 | 20 | 40 | 40 |
| Component [D]-1 naphthalene type epoxy resin | "EPICLON ®"HP-4032D | Naphthalene type epoxy resin |  |  |  |  |
| Component [D]-2 isocyanuric acid type epoxy resin | "TEPIC ®"-S | Isocyanuric acid type epoxy resin |  |  |  |  |
| Component [B] bisphenol F type epoxy resin being solid at 25° C. | "Epotohto ®"YDF2001 | Bisphenol F type epoxy resin |  |  |  | 10 |
| Component [G] another epoxy resin | "EPICLON ®"830 | Bisphenol F type epoxy resin | 25 | 10 | 10 |  |
|  | "jER ®"154 | Phenol novolac type epoxy resin |  |  |  |  |

TABLE 4-continued

| | | | | | | |
|---|---|---|---|---|---|---|
| Component [F] dicyandiamide or its derivative | DICY7 | Dicyandiamide | 9.1 | 10.0 | 9.1 | 8.7 |
| Component [I] curing accelerator thermoplastic resin | DCMU99 | Dichlorodimethylurea | 6.0 | 6.5 | 6.0 | 5.7 |
| Total content of component [A] and component [E] | | | 75 | 90 | 90 | 90 |
| Resin cured product properties | Flexural modulus (GPa) | | 4.8 | 5.0 | 4.9 | 4.9 |
| | Bending strength (MPa) | | 203 | 203 | 201 | 205 |
| | Bending strain (%) | | 6.3 | 5.7 | 5.9 | 6.0 |
| | Glass transition temperature (° C.) | | 124 | 147 | 129 | 124 |
| Composite properties | Bending strength in 0° direction (MPa) | | 1862 | 1900 | 1887 | 1890 |
| | Bending strength in 90° direction (MPa) | | 142 | 143 | 140 | 141 |

| | Component | | Example 28 | Example 29 | Example 30 | Example 31 |
|---|---|---|---|---|---|---|
| Component [A] trifunctional amine type epoxy resin | "Araldite ®"MY0600 | Aminophenol type epoxy resin | 50 | 70 | 80 | 70 |
| Component [E] sorbitol type epoxy resin | "DENACOL ®"EX-614B | Sorbitol type epoxy resin | 40 | 10 | 10 | 20 |
| Component [D]-1 naphthalene type epoxy resin | "EPICLON ®"HP-4032D | Naphthalene type epoxy resin | | 20 | | 10 |
| Component [D]-2 isocyanuric acid type epoxy resin | "TEPIC ®"-S | Isocyanuric acid type epoxy resin | | | 10 | |
| Component [B] bisphenol F type epoxy resin being solid at 25° C. | "Epotohto ®"YDF2001 | Bisphenol F type epoxy resin | | | | |
| Component [G] another epoxy resin | "EPICLON ®"830 | Bisphenol F type epoxy resin type epoxy resin | | | | |
| | "jER ®"154 | Phenol novolac type epoxy resin | 10 | | | |
| Component [F] dicyandiamide or its derivative | DICY7 | Dicyandiamide | 9.1 | 10.3 | 11.0 | 10.2 |
| Component [I] curing accelerator thermoplastic resin | DCMU99 | Dichlorodimethylurea | 5.9 | 6.7 | 7.1 | 6.6 |
| Total content of component [A] and component [E] | | | 90 | 80 | 90 | 90 |
| Resin cured product properties | Flexural modulus (GPa) | | 4.9 | 5.0 | 5.4 | 5.1 |
| | Bending strength (MPa) | | 199 | 192 | 194 | 210 |
| | Bending strain (%) | | 6.0 | 5.4 | 5.0 | 6.0 |
| | Glass transition temperature (° C.) | | 133 | 162 | 175 | 155 |
| Composite properties | Bending strength in 0° direction (MPa) | | 1880 | 1910 | 2050 | 1910 |
| | Bending strength in 90° direction (MPa) | | 137 | 135 | 140 | 147 |

TABLE 5

| | Component | | Example 32 | Example 33 | Example 34 | Example 35 |
|---|---|---|---|---|---|---|
| Component [A] trifunctional amine type epoxy resin | "Araldite ®"MY0500 | Aminophenol type epoxy resin | | | | 50 |
| | "Araldite ®"MY0600 | | 50 | 60 | 50 | |
| Component [E] sorbitol type epoxy resin | "DENACOL ®"EX-614B | Sorbitol type epoxy resin | 25 | 20 | 40 | 25 |
| Component [D]-1 naphthalene type epoxy resin | "EPICLON ®"HP-4032D | Naphthalene type epoxy resin | 25 | | 10 | 25 |
| Component [D]-2 isocyanuric acid type epoxy resin | "TEPIC ®"-S | Isocyanuric acid type epoxy resin | | 20 | | |
| Component [F] dicyandiamide or its derivative | DICY7 | Dicyandiamide | 9.5 | 10.6 | 9.3 | 9.3 |
| Component [H] thermoplastic resin | "SUMIKAEXCEL ®" "VINYLEC ®"K | Polyether sulfone Polyvinyl formal | | | | |
| Component [I] curing accelerator | DCMU99 | Dichlorodimethylurea | 6.2 | 6.9 | 6.1 | 6.1 |

TABLE 5-continued

| | | | | | | |
|---|---|---|---|---|---|---|
| Total content of component [A] and component [E] | | | 75 | 80 | 90 | 75 |
| Resin cured product properties | Flexural modulus (GPa) | | 4.9 | 5.4 | 4.9 | 4.7 |
| | Bending strength (MPa) | | 225 | 208 | 222 | 213 |
| | Bending strain (%) | | 6.5 | 5.0 | 6.4 | 6.5 |
| | Glass transition temperature (° C.) | | 145 | 171 | 136 | 153 |
| Composite properties | Bending strength in 0° direction (MPa) | | 1880 | 1910 | 1893 | 1850 |
| | Bending strength in 90° direction (MPa) | | 143 | 140 | 137 | 135 |

| | Component | | Example 36 | Example 37 | Example 38 |
|---|---|---|---|---|---|
| Component [A] trifunctional amine type epoxy resin | "Araldite ®"MY0500 "Araldite ®"MY0600 | Aminophenol type epoxy resin | 50 | 50 | 60 |
| Component [E] sorbitol type epoxy resin | "DENACOL ®"EX-614B | Sorbitol type epoxy resin | 25 | 25 | 40 |
| Component [D]-1 naphthalene type epoxy resin | "EPICLON ®"HP-4032D | Naphthalene type epoxy resin | 25 | 25 | |
| Component [D]-2 isocyanuric acid type epoxy resin | "TEPIC ®"-S | Isocyanuric acid type epoxy resin | | | |
| Component [F] dicyandiamide or its derivative | DICY7 | Dicyandiamide | 9.5 | 9.5 | 9.5 |
| Component [H] thermoplastic resin | "SUMIKAEXCEL ®" PES2603P | Polyether sulfone | | 20 | 20 |
| | "VINYLEC ®"K | Polyvinyl formal | 10 | | |
| Component [I] curing accelerator | DCMU99 | Dichlorodimethylurea | 6.2 | 6.2 | 6.2 |
| Total content of component [A] and component [E] | | | 75 | 75 | 100 |
| Resin cured product properties | Flexural modulus (GPa) | | 4.3 | 4.8 | 5.0 |
| | Bending strength (MPa) | | 195 | 203 | 195 |
| | Bending strain (%) | | 6.0 | 6.6 | 6.0 |
| | Glass transition temperature (° C.) | | 141 | 144 | 136 |
| Composite properties | Bending strength in 0° direction (MPa) | | 1790 | 1870 | 1904 |
| | Bending strength in 90° direction (MPa) | | 141 | 158 | 151 |

TABLE 6-1

| | | Component | Comparative Example 1 | Comparative Example 2 | Comparative Example 3 |
|---|---|---|---|---|---|
| Component [A] trifunctional amine type epoxy resin | "Araldite ®"MY0500 "Araldite ®"MY0600 | Aminophenol type epoxy resin | 50 | 15 | |
| Component [B] bisphenol F type epoxy resin being solid at 25° C. | "jER ®"4007P | Bisphenol F type epoxy resin | 30 | | |
| Component [G] another epoxy resin | "jER ®"828 "jER ®"1001 | Bisphenol A type epoxy resin | | 10 | 46 45 |
| | "EPICLON ®"830 | Bisphenol F type epoxy resin | 20 | 10 | |
| | NER-7064 | Polyfunctional bisphenol type epoxy resin | | 25 | |
| | EHPE3150 | Alicyclic epoxy resin | | 25 | |
| | AER4152 | Oxazolidine ring type epoxy resin | | 15 | 9 |
| Component [C] aromatic amine compound | SEIKACURE-S 3,3'-DAS | 4,4'-diaminodiphenylsulfone 3,3'-diaminodiphenylsulfone | | | |
| Component [H] thermoplastic resin | "VINYLEC ®"K "VINYLEC ®"E "Virantage ®"VW-10700RFP | Polyvinyl formal Polyvinyl formal Polyether sulfone | 2 | 3 | 1 |
| Component [F] dicyandiamide or its derivative | DICY7 | Dicyandiamide | 6.2 | 10 | 5 |
| Component [I] curing accelerator | DCMU99 | Dichlorodimethylurea | 2 | 7 | 1.5 |
| Average epoxy equivalent of component [B] (g/eq) | | | 2273 | 0 | 0 |
| Average epoxy equivalent of component [A] (g/eq) | | | 113 | 118 | 0 |
| Formula (1): average epoxy equivalent of component [B]/average epoxy equivalent of component [A] (Eb/Ea) | | | 20.1 | 0.0 | 0.0 |
| Active group mole number in epoxy resin/active hydrogen mole number of component [C] (Ma/Mc) | | | 1.11 | 0.58 | 0.86 |
| Resin cured product properties | Glass transition temperature (° C.): X | | 93 | 140 | 128 |
| | Storage elastic modulus in rubber state (MPa): Y | | 5.9 | 4.9 | 9.0 |

TABLE 6-1-continued

|  | Component | Comparative Example 1 | Comparative Example 2 | Comparative Example 3 |
|---|---|---|---|---|
|  | Formula (2): 0.087X − 6 ≤ Y ≤ 0.087X − 4 | 2.1 ≤ Y ≤ 4.1 | 6.2 ≤ Y ≤ 8.2 | 5.1 ≤ Y ≤ 7.1 |
|  | Formula (3): Storage elastic modulus in rubber state/active group mole number in epoxy resin (Y/Ma) | 1027 | 1007 | 2502 |
|  | Flexural modulus (GPa) | 4.5 | 4.1 | 3.0 |
|  | Bending strength (MPa) | 180 | 180 | 131 |
|  | Bending strain (%) | 4.3 | 7.4 | 7.0 |
| Composite properties | Bending strength in 0° direction (MPa) | 1701 | 1615 | 1420 |
|  | Bending strength in 90° direction (MPa) | 113 | 101 | 112 |
|  | $G_{1C}$ (J/m²) | 228 | 270 | 227 |
|  | $G_{2C}$ (J/m²) | 483 | 428 | 354 |

TABLE 6-2

|  |  | Component | Comparative Example 4 | Comparative Example 5 | Comparative Example 6 |
|---|---|---|---|---|---|
| Component [A] trifunctional amine type epoxy resin | "Araldite ®"MY0500 | Aminophenol type epoxy resin | 100 | 60 | 50 |
|  | "Araldite ®"MY0600 |  |  |  |  |
| Component [B] bisphenol F type epoxy resin being solid at 25° C. | "jER ®"4007P | Bisphenol F type epoxy resin |  |  | 30 |
| Component [G] another epoxy resin | "jER ®"828 | Bisphenol A type epoxy resin |  |  |  |
|  | "jER ®"1001 |  |  |  |  |
|  | "EPICLON ®"830 | Bisphenol F type epoxy resin |  | 40 | 20 |
|  | NER-7064 | Polyfunctional bisphenol type epoxy resin |  |  |  |
|  | EHPE3150 | Alicyclic epoxy resin |  |  |  |
|  | AER4152 | Oxazolidine ring type epoxy resin |  |  |  |
| Component [C] aromatic amine compound | SEIKACURE-S | 4,4'-diaminodiphenylsulfone |  | 88 |  |
|  | 3,3'-DAS | 3,3'-diaminodiphenylsulfone | 54.5 |  | 34.5 |
| Component [H] thermoplastic resin | "VINYLEC ®"K | Polyvinyl formal |  |  | 4 |
|  | "VINYLEC ®"E | Polyvinyl formal |  |  |  |
|  | "Virantage ®"VW-10700RFP | Polyether sulfone |  | 19 |  |
| Component [F] dicyandiamide or its derivative | DICY7 | Dicyandiamide |  |  |  |
| Component [I] curing accelerator | DCMU99 | Dichlorodimethylurea |  |  |  |
| Average epoxy equivalent of component [B] (g/eq) |  |  | 0 | 0 | 2273 |
| Average epoxy equivalent of component [A] (g/eq) |  |  | 118 | 118 | 118 |
| Formula (1): average epoxy equivalent of component [B]/average epoxy equivalent of component [A] (Eb/Ea) |  |  | 0.0 | 0.0 | 19.3 |
| Active group mole number in epoxy resin/active hydrogen mole number of component [C] (Ma/Mc) |  |  | 0.96 | 0.53 | 1.00 |
| Resin cured product properties | Glass transition temperature (° C.): X |  | 170 | 182 | 158 |
|  | Storage elastic modulus in rubber state (MPa): Y |  | 8.0 | 7.1 | 5.5 |
|  | Formula (2): 0.087X − 6 ≤ Y ≤ 0.087X − 4 |  | 8.8 ≤ Y ≤ 10.8 | 9.8 ≤ Y ≤ 11.8 | 7.7 ≤ Y ≤ 9.7 |
|  | Formula (3): Storage elastic modulus in rubber state/active group mole number in epoxy resin (Y/Ma) |  | 944 | 951 | 989 |
|  | Flexural modulus (GPa) |  | 3.7 | 4.3 | 4.5 |
|  | Bending strength (MPa) |  | 181 | 181 | 180 |
|  | Bending strain (%) |  | 5.8 | 5.8 | 5.0 |
| Composite properties | Bending strength in 0° direction (MPa) |  | 1510 | 1675 | 1667 |
|  | Bending strength in 90° direction (MPa) |  | 107 | 98 | 89 |
|  | $G_{1C}$ (J/m²) |  | 242 | 218 | 199 |
|  | $G_{2C}$ (J/m²) |  | 421 | 312 | 365 |

TABLE 7-1

| | Component | | Comparative Example 7 | Comparative Example 8 | Comparative Example 9 |
|---|---|---|---|---|---|
| Component [A] trifunctional amine type epoxy resin | "Araldite ®""MY0500" | Aminophenol type epoxy resin | | | 10 |
| | "Araldite ®""MY0600" | | 50 | 50 | 50 |
| Component [B] bisphenol F type epoxy resin being solid at 25° C. | "Epotohto ®""YDF2001" | Bisphenol F type epoxy resin | | 30 | |
| | "Epotohto ®""YDF2004" | | 30 | | |
| Component [G] another epoxy resin | "jER ®""4010P" | | | | |
| | "SUMI-EPOXY ®""ELM434" | Tetrafunctional glycidyl amine type epoxy | | | |
| | "jER ®""1010" | Bisphenol A type epoxy resin | | | |
| | "jER ®""1004" | | | | 40 |
| | "EPICLON ®""830" | Bisphenol F type epoxy resin | 20 | 20 | |
| Component [C] aromatic amine compound | SEIKACURE-S | 4,4'-diaminodiphenylsulfone | | | 34.5 |
| | 3,3'-DAS | 3,3'-diaminodiphenylsulfone | 34 | 37.4 | |
| Component [H] thermoplastic resin | "VINYLEC ®""K" | Polyvinyl formal | 2 | 1 | 4 |
| | "SUMIKAEXCEL ®"" PES5003P" | Polyether sulfone | | | |
| Average epoxy equivalent of component [B] (g/eq) | | | 4190 | 480 | 0 |
| Average epoxy equivalent of component [A] (g/eq) | | | 118 | 118 | 117 |
| Formula (1): average epoxy equivalent of component [B]/average epoxy equivalent of component [A] (Eb/Ea) | | | 35.5 | 4.1 | 0.0 |
| Active group mole number in epoxy resin/active hydrogen mole number of component [C] (Ma/Mc) | | | 1.00 | 1.00 | 1.00 |
| Resin cured product properties | Glass transition temperature (° C.): X | | 160 | 143 | 180 |
| | Storage elastic modulus in rubber state (MPa): Y | | 5.9 | 5.7 | 14.3 |
| | Formula (2): $0.087X - 6 \leq Y \leq 0.087X - 4$ | | $7.9 \leq Y \leq 9.9$ | $6.4 \leq Y \leq 8.4$ | $9.7 \leq Y \leq 11.7$ |
| | Formula (3): Storage elastic modulus in rubber state/active group mole number in epoxy resin (Y/Ma) | | 1073 | 942 | 2574 |
| | Flexural modulus (GPa) | | 4.4 | 4.3 | 4.0 |
| | Bending strength (MPa) | | 175 | 180 | 170 |
| | Bending strain (%) | | 4.7 | 5.1 | 4.7 |
| Composite properties | Bending strength in 0° direction (MPa) | | 1670 | 1665 | 1550 |
| | Bending strength in 90° direction (MPa) | | 90 | 97 | 89 |
| | $G_{1C}$ (J/m²) | | 230 | 220 | 240 |
| | $G_{2C}$ (J/m²) | | 460 | 476 | 466 |

TABLE 7-2

| | Component | | Comparative Example 10 | Comparative Example 11 |
|---|---|---|---|---|
| Component [A] trifunctional amine type epoxy resin | "Araldite ®""MY0500" | Aminophenol type epoxy resin | 10 | |
| | "Araldite ®""MY0600" | | 50 | |
| Component [B] bisphenol F type epoxy resin being solid at 25° C. | "Epotohto ®""YDF2001" | Bisphenol F type epoxy resin | | |
| | "Epotohto ®""YDF2004" | | | 30 |
| Component [G] another epoxy resin | "jER ®""4010P" | | | |
| | "SUMI-EPOXY ®""ELM434" | Tetrafunctional glycidyl amine type epoxy | | |
| | "jER ®""1010" | Bisphenol A type epoxy resin | 30 | |
| | "jER ®""1004" | | | |
| | "EPICLON ®""830" | Bisphenol F type epoxy resin | 10 | 10 |
| | TG3DAS | | | |
| Component [C] aromatic amine compound | SEIKACURE-S | 4,4'-diaminodiphenylsulfone | | 38 |
| | 3,3'-DAS | 3,3'-diaminodiphenylsulfone | 40 | |
| Component [H] thermoplastic resin | "VINYLEC ®""K" | Polyvinyl formal | 5 | |
| | "SUMIKAEXCEL ®"" PES5003P" | Polyether sulfone | | 8 |
| Average epoxy equivalent of component [B] (g/eq) | | | 0 | 0 |
| Average epoxy equivalent of component [A] (g/eq) | | | 117 | 0 |
| Formula (1): average epoxy equivalent of component [B]/average epoxy equivalent of component [A] (Eb/Ea) | | | 0.0 | 0.0 |
| Active group mole number in epoxy resin/active hydrogen mole number of component [C] (Ma/Mc) | | | 0.98 | 0.95 |
| Resin cured product properties | Glass transition temperature (° C.): X | | 175 | 190 |
| | Storage elastic modulus in rubber state (MPa): Y | | 15.3 | 15.6 |
| | Formula (2): $0.087X - 6 \leq Y \leq 0.087X - 4$ | | $9.2 \leq Y \leq 11.2$ | $10.5 \leq Y \leq 12.5$ |
| | Formula (3): Storage elastic modulus in rubber state/active group mole number in epoxy resin (Y/Ma) | | 2411 | 2681 |
| | Flexural modulus (GPa) | | 4.2 | 4.0 |
| | Bending strength (MPa) | | 170 | 160 |
| | Bending strain (%) | | 4.9 | 4.2 |

TABLE 7-2-continued

| | Component | Comparative Example 10 | Comparative Example 11 |
|---|---|---|---|
| Composite properties | Bending strength in 0° direction (MPa) | 1590 | 1531 |
| | Bending strength in 90° direction (MPa) | 88 | 85 |
| | $G_{1C}$ (J/m$^2$) | 235 | 240 |
| | $G_{2C}$ (J/m$^2$) | 455 | 460 |

TABLE 8

| | | Component | Comparative Example 12 | Comparative Example 13 | Comparative Example 14 | Comparative Example 15 | Comparative Example 16 |
|---|---|---|---|---|---|---|---|
| Component [A] trifunctional amine type epoxy resin | "Araldite ®"MY0500 "Araldite ®"MY0600 | Aminophenol type epoxy resin | 40 | | 20 | | 50 |
| Component [E] sorbitol type epoxy resin | "DENACOL ®" EX-614B | Sorbitol type epoxy resin | | 40 | 15 | | |
| Component [B] bisphenol F type epoxy resin being solid at 25° C. | "jER ®"4007P | Bisphenol F type epoxy resin | | | | | 30 |
| Component [G] another epoxy resin | "jER ®"828 | Bisphenol A type epoxy resin | | | | 10 | |
| | "jER ®"1002 | | | | | 12 | |
| | "EPICLON ®"830 | Bisphenol F type epoxy resin | 60 | 60 | 65 | | 20 |
| | "jER ®"807 | | | | | 16 | |
| | NER-7604 | Polyfunctional bisphenol type epoxy resin | | | | | |
| | EHPE3150 | Alicyclic epoxy resin | | | | | |
| | AER4152 | Oxazolidone ring type epoxy resin | | | | 45 | |
| | GOT | N,N'-diglycidyl-o-toluidine | | | | 3 | |
| Component [F] dicyandiamide or its derivative | DICY7 | Dicyandiamide | 8.7 | 7.0 | 7.8 | 5.0 | 6.3 |
| Component [H] thermoplastic resin | "VINYLEC ®"E | Polyvinyl formal | | | | | |
| | YP-70 | Bisphenol A/bisphenol F copolymerization type phenoxy resin | | | | 4 | |
| Component [I] curing accelerator | DCMU99 | Dichlorodimethylurea | 5.8 | 4.5 | 5.1 | 3.0 | 2.0 |
| Total content of component [A] and component [E] | | | 40 | 40 | 35 | — | 50 |
| Resin cured product properties | Flexural modulus (GPa) | | 4.2 | 3.8 | 4.0 | 3.4 | 4.5 |
| | Bending strength (MPa) | | 170 | 163 | 170 | 161 | 178 |
| | Bending strain (%) | | 5.4 | 6.6 | 6.2 | 7.0 | 4.5 |
| | Glass transition temperature (° C.) | | 133 | 95 | 115 | 141 | 133 |
| Composite properties | Bending strength in 0° direction (MPa) | | 1613 | 1589 | 1593 | 1670 | 1820 |
| | Bending strength in 90° direction (MPa) | | 91 | 100 | 94 | 102 | 85 |

The unit of each component in Tables is parts by mass.

INDUSTRIAL APPLICABILITY

The epoxy resin composition according to the present invention achieves both the high elastic modulus and the high bending strain at a high level, and provides a resin cured product having excellent heat resistance, so that the fiber-reinforced composite material in which the epoxy resin composition is used has excellent bending strength in the 0° direction and excellent bending strength in the 90° direction. As a result, the weight of the fiber-reinforced composite material can be reduced, therefore, the degree of freedom in structural design is increased, and it is expected that the possibility of application to various structures is expanded.

The invention claimed is:

1. An epoxy resin composition comprising:
   a component [A] being a trifunctional amine type epoxy resin;
   a component [D] including a component [D]-2, the component [D]-2 being an isocyanuric acid type epoxy resin;
   a component [E] being a sorbitol type epoxy resin; and
   a component [F] being dicyandiamide or a derivative of dicyandiamide,
   wherein all of a condition 8, a condition 9, and a condition 10 described below are satisfied,
   the condition 8 being that a resin cured product produced by reacting the epoxy resin composition at 130° C. for 90 minutes has a flexural modulus of 4.3 GPa or more,
   the condition 9 being that the resin cured product produced by reacting the epoxy resin composition at 130° C. for 90 minutes has a bending strength of 190 MPa or more,
   the condition 10 being that the epoxy resin composition includes the component [A] and the component [E] at a total content of 40 parts by mass or more based on 100 parts by mass of all epoxy resins in the epoxy resin composition, and
   the component [E] is included at a content of 25 to 40 parts by mass based on 100 parts by mass of all the epoxy resins.

2. The epoxy resin composition according to claim 1, wherein a thermoplastic resin is included as a component [H].

3. The epoxy resin composition according to claim 2, wherein the thermoplastic resin is polyether sulfone.

* * * * *